US008063969B2

(12) United States Patent  
Oshima et al.

(10) Patent No.: US 8,063,969 B2
(45) Date of Patent: Nov. 22, 2011

(54) IMAGING DEVICE

(75) Inventors: Masaaki Oshima, Minato-ku (JP); Shin Miyashita, Minato-ku (JP); Masahiko Ito, Minato-ku (JP)

(73) Assignee: Sony Corporation, Tokyo (JP)

( * ) Notice: Subject to any disclaimer, the term of this patent is extended or adjusted under 35 U.S.C. 154(b) by 736 days.

(21) Appl. No.: 10/573,917

(22) PCT Filed: Sep. 21, 2004

(86) PCT No.: PCT/JP2004/014129
§ 371 (c)(1),
(2), (4) Date: Jun. 15, 2007

(87) PCT Pub. No.: WO2005/034509
PCT Pub. Date: Apr. 14, 2005

(65) Prior Publication Data
US 2007/0229694 A1    Oct. 4, 2007

(30) Foreign Application Priority Data

Oct. 2, 2003   (JP) ................................. 2003-344912
Dec. 22, 2003  (JP) ................................. 2003-425367
Sep. 6, 2004   (JP) ................................. 2004-259093

(51) Int. Cl.
H04N 5/222 (2006.01)
(52) U.S. Cl. .................. 348/333.01; 348/373; 348/374; 348/375; 348/376
(58) Field of Classification Search ....... 348/333.01–333.09, 372–376
See application file for complete search history.

(56) References Cited

U.S. PATENT DOCUMENTS

| 5,659,361 | A | * | 8/1997 | Jin ................................. 348/375 |
| 5,801,774 | A | * | 9/1998 | Seo .......................... 348/333.06 |
| 5,982,429 | A | * | 11/1999 | Kamamoto et al. ..... 348/333.06 |
| 2002/0196358 | A1 | | 12/2002 | Kim |

FOREIGN PATENT DOCUMENTS

| EP | 1 251 691 | 10/2002 |
| JP | 62-167460 | 10/1987 |
| JP | 2-162875 | 6/1990 |
| JP | 2-211779 | 8/1990 |
| JP | 3-124173 | 5/1991 |
| JP | 8-125890 | 5/1996 |
| JP | 2000-50118 | 2/2000 |
| JP | 2003-60957 | 2/2003 |

* cited by examiner

Primary Examiner — Yogesh Aggarwal
(74) Attorney, Agent, or Firm — Oblon, Spivak, McClelland, Maier & Neustadt, L.L.P.

(57) ABSTRACT

An image pickup apparatus in which a display surface of a display device can be looked at favorably when imaging a subject and in which it never happens that the display device becomes obstructive during imaging and it is possible to carry out an imaging operation with good stability. The image pickup apparatus includes an imaging device forming a video signal of a subject according to a light inputted from a lens device; a liquid crystal display displaying a video picture, according to the video signal; and an image pickup apparatus body housing the imaging device and having a handle extended approximately parallel with a light axis of a lens system of the lens device. The liquid crystal display is provided integrally or by another member on the front side in the light axis direction of the handle such that the posture thereof can be changed. The display device can be arranged at the most conspicuous position when taking a picture by holding the handle, so that it is possible to improve operationality when taking a picture.

20 Claims, 23 Drawing Sheets

IMAGING DEVICE

TECHNICAL FIELD

The present invention relates to an image pickup apparatus provided with a display device which can display a video (picture) of an imaged subject or a video stored in a memory device beforehand and more particularly relates to an image pickup apparatus in which a display surface of a display device can be looked at favorably when imaging a subject, furthermore, it never happens that the display device becomes obstructive during the imaging and it is possible to carry out an imaging operation with good stability.

BACKGROUND ART

As a first example of this kind of a conventional image pickup apparatus, there exists, for example, an apparatus such as described in Patent Reference 1. The Patent Reference 1 is a patent application filed before by the applicant of this patent wherein there is described an apparatus relating to a video camera in which it is constituted such that visibility of an electronic viewfinder is heightened by attaching an electronic viewfinder so as to be freely opening, closing and rotating with respect to a main body portion of a video camera and it is made possible to have correspondence with various usage embodiments of a video camera.

The video camera described in the Patent Reference 1 has a feature in "in a rotation supporting portion for rotatably supporting one side edge portion of an electronic viewfinder for monitoring a video signal imaged by an imaging means which is housed in a main body portion such that the other side edge portion departs from the housing portion on the side face of aforesaid main body portion, it is constituted such that an auxiliary rotation means having a rotational axis in a direction orthogonal to the rotational axis of aforesaid rotation supporting portion intervenes and one of the two sides of aforesaid electronic viewfinder is selected such that it can be housed into aforesaid housing portion".

According to a video camera having such a constitution, there is expected an effect such as "since the electronic viewfinder is made freely rotatable in two directions of a direction in which the other side edge portion thereof may depart from the housing portion on the side face of the main body portion and a direction in which a rotational axis is possessed in a direction orthogonal to this rotational axis and it is possible to select one of two sides of the electronic viewfinder so as to house it, it is possible to prevent damage, scratch or adherence of stain on the display surface of the electronic viewfinder and at the same time if it is housed such that the display surface of the electronic viewfinder can be seen, it can be used even while the electronic viewfinder is maintained to be housed" or the like.

However, in case of such a video camera, it was constituted such that the electronic viewfinder on the side face portion of the case body housing the imaging means is freely rotatable to the side direction thereof and is supported freely rotatable also to the up and down direction thereof, but there occurred the following problems as being explained with reference to FIG. 20, FIG. 21 and FIG. 22. FIG. 20 to FIG. 22 explain use states of a video camera 1 in the past, wherein a reference numeral 2 is a case body as an image pickup apparatus body housing an imaging means and a handle 3 extending in a front and rear direction is provided on an upper portion of the case body 2. A microphone 4 is provided integrally on a front portion of the handle 3 and a viewfinder 5 is provided on a rear portion thereof.

Also, a lens device 6 projecting forward is mounted on a front portion of the case body 2 and a liquid crystal display 7 is mounted on a side face portion of the case body 2. The liquid crystal display 7 is made to be freely rotatable in a horizontal direction which is a side direction with respect to the case body 2 approximately by 90 degree and is constituted such that it can be held by an arbitrary position between a display "closing" state in which it is housed in a side face portion of the case body 2 and a display "open" state in which it is turned approximately by 90 degree so as to be projected to a side direction thereof. Further, the liquid crystal display 7 is constituted such that it is freely rotatable approximately by 180 degree also to an up and down direction and in a state in which it is turned by equal to or more than a predetermined angle to the open side (see FIG. 20), it is possible by turning it to the up and down direction (see FIG. 21) to take a state facing the display surface to rear direction and a state facing the display surface to front direction.

By taking such a constitution, if it is attempted to support the video camera 1 by setting the display surface at the height of eyes, for example, in a state facing the display surface of the liquid crystal display 7 to rear direction as shown in FIG. 20, an angle α0 made by an upper arm line AB connecting a joint of shoulder A and a joint of elbow B of a photographer and a perpendicular line AV dropped perpendicularly from the joint of shoulder A and an angle β0 made by a lower arm line BC connecting the joint of elbow B and a joint of wrist C and the upper arm line AB increase concurrently. In order to support the video camera 1 in this state, it has to be supported by adding a big power to the hand, so that not only fatigue of the photographer increases but also there was a problem that the display surface cannot be stabilized owing to its shaking.

Also, as shown in FIG. 21, if the video camera 1 is supported by pressing the tip of the viewfinder 5 to the breast such that the display surface of the liquid crystal display 7 will not shake and the display surface of the liquid crystal display 7 is directed to the eyes of the photographer in this state, an angle γ0 made by a horizontal eye line EH when the eyes see a horizontal direction and a display surface directed eye line ED when the eyes see display surface will increase. Therefore, it is necessary for a photographer to swing his head hugely in the up and down direction in order to the subject and the display surface alternately, so that not only his neck became tired but also there was a case in which a picture recording chance was missed.

Further, as shown in FIG. 22, in case of taking a picture by a low angle by holding the video camera 1 from which the liquid crystal display 7 is projected to the side direction while the hand F is lowered, it is necessary to support the video camera 1 by making it away from the leg G by a distance S0 in order to avoid the liquid crystal display 7 from hitting the leg G of the photographer. Therefore, an angle θ0 made by an arm line AC connecting the joint of shoulder A of the photographer and the joint of wrist C and the perpendicular line AV dropped perpendicularly from the joint of shoulder A increases to a certain degree. In order to support the video camera 1 in this state, posture for making the hand F away from the body must be taken, so that it was necessary to support it by adding a big power to the hand F and there was also a problem that cramped posture which feels weight easily must be taken.

As a second example of the image pickup apparatus in the past, there also exists such as described, for example, in Patent Reference 2. In the Patent Reference 2, there is described a device relating to an operation display device for displaying an operation when taking a picture by a video camera. The operation display device described in the Patent Reference 2 has a feature in "a display portion is mounted on a handle portion provided on an uppermost portion of a main body such that it can be housed, aforesaid display portion is made to be buried in or projected from with respect to aforesaid handle portion and concurrently, aforesaid display portion is provided so as to be confirmed from the rearward of aforesaid main body at least in a state in which aforesaid display portion is projected".

According to an operation display device having such a constitution, there is expected an effect such as "an LED which is an indicator is provided at a handle portion lying on the uppermost portion of the camera body, so that it is possible to confirm the operation display from the rear side easily and also, it has a constitution mounting the indicator such that it can be housed in the handle portion, so that it is possible by burying the indicator within the handle portion when not taking a picture to protect it with respect to external shocks" or the like.

However, in case of such an operation display device, the display portion was provided in order to confirm whether or not the camera is operating and it was not possible to confirm the state of the subject. Furthermore, the display portion of the operation display device was provided to make it possible to confirm the operation display from the rear side and it was not constituted such that video can be displayed.

As a third example of an image pickup apparatus in the past, there also exists such as described, for example, in Patent Reference 3. In the Patent Reference 3, there is described an apparatus relating to an image pickup apparatus of a video camera or the like provided with a video monitor unit. This image pickup apparatus has a feature in "a video monitor unit is arranged in the vicinity of an image optical system and also at a front portion of the image pickup apparatus on the side opposite to the camera grid with respect to the center of the image pickup apparatus". According to an image pickup apparatus having such a constitution, there is expected an effect such as "by arranging a monitor display at a front portion of the image pickup apparatus such as a camera or the like, a large sized preferable picture monitor which can be confirmed by both of the eyes can be realized" or the like.

Also, as a fourth example of an image pickup apparatus in the past, there also exists such as disclosed, for example, in Patent Reference 4 and use application of the image pickup apparatus will be outlined with reference to FIG. 23 and FIG. 24. An image pickup apparatus 100 is constituted by a case body 111 made by a hollow housing, a lens device 109 mounted on a front face of the case body 111 so as to be projected, imaging means, which is not shown, for forming a video signal of a subject according to a light inputted from the lens device 109, a display device for displaying a video according to a video signal formed by the imaging means or information recorded beforehand on an information recording medium (memory device of imaging means), etc.

For the display device, a device having a relatively large picture screen such as being used as a monitor by means of a liquid crystal display panel 101 or the like for confirming a picture taken or the like and a small sized display device are built-in, and there is provided with an electronic viewfinder 102 freely rotatable to the upper direction as shown in FIG. 24. The electronic viewfinder 102 is a device which is used when there is trouble in seeing pictures of the liquid crystal display panel of a large picture screen or the like caused by outside light particularly under a bright daylight or the like and then when taking a picture in which camera work commencing with framing is brought out adequately is to be carried out or the like.

Then, the electronic viewfinder 102 is provided, as shown in FIG. 23, so as to be protruded from the case body 111 on the rear side in the light axis direction of the lens device and at the upper portion of the back face of the case body 111, more specifically, approximately at a straight upper portion of a housing portion of a battery 107 approximately in parallel with the light axis thereof. A turning axis which is not shown of the electronic viewfinder 102 is arranged at an upper portion on the back face of the case body 111 and it is constituted such that it can turn around the rotational axis within a region of a predetermined angle.

Also, as shown in FIG. 23 and FIG. 24, the battery 107 for supplying electric power to the image pickup apparatus is mounted detachably on a concave depression portion formed at a back face of the case body 111. With respect to the exchange of this battery 107 in case of a normal state in which the electronic viewfinder 102 is directed approximately to light axis direction as shown in FIG. 23, the upper portion of the electronic viewfinder 102 is first turned so as to be in an obliquely upward state as shown in FIG. 24. Then, the upper portion of the battery in the battery housing portion is to be exposed so as to make a space in which a manual operation is available by inserting fingers. Next, the top and bottom or the right and left of the battery 107 are grasped by fingers of one hand and the battery 107 is unlocked while pushing a fixing release button 108 by a finger of the other hand. Thereafter, an exchange operation was carried out according to a procedure in which another battery is mounted and the electronic viewfinder 102 is return to the primary position.

Also, in this image pickup apparatus, the rotational axis of the electronic viewfinder 102 is to be arranged at the upper portion of the back face of the case body 111 and at an upper portion of the battery housing portion, so that it was constituted such that the mechanism for this turning is to be provided on the rear side of the case body 111.

However, as an image pickup apparatus such as for business use which is used in a job site of a news report or the like, an apparatus such as one which can work speedily and certainly by one action without changing a setting position as much as possible has been desired and for the battery exchange in an image pickup apparatus in the past, there were required three actions of at least turning of the electronic viewfinder 102 and thereafter, battery exchange and state restoring of the electronic viewfinder 102, so that shortening of the operation (one-action making) has been desired.

Also, in the image pickup apparatus in the past, the back face of the case body 111 at the upper portion of the battery 107 which becomes an upper portion of the battery housing portion was cut to be open and the electronic viewfinder 102 is housed there freely rotatably and further, the rotational axis of the electronic viewfinder 102 and the like are also arranged therein, so that there was an inconvenience in which the strength at the back face of the case body 111 becomes insufficient. Further, as shown in FIG. 24, the coupling portion of the handle 104 and the case body 111 in which the rotational axis of the electronic viewfinder 102 is provided is housed in a protuberant portion at the rear portion of the case body 111 such that the image pickup apparatus itself becomes huge or a huge projection is made rearwards the electronic viewfinder 102, so that there was also inconvenience that it was difficult to differentiate the product from the viewpoint of design.

Patent Reference 1: Japanese laid-open publication H8-125890

Patent Reference 2: Japanese laid-open publication H2-162875

Patent Reference 3: Japanese laid-open publication H5-191698

Patent Reference 4: Japanese laid-open publication 2001-189883 (Page 2, FIG. 2)

DISCLOSURE OF THE INVENTION

The problem to be solved lies in that an image pickup apparatus in the past had problems such that since a display device was provided on the side face portion of a case body, it had to be supported by adding a big power to the hand supporting the video camera, not only fatigue of a photographer when taking a picture is large but also the display surface is shaken and is difficult to be made stable, further, it may happen that the neck will be tired caused by a fact that it is necessary to swing the head hugely in order to see the subject and the display surface alternately so as to miss a picture recording chance and the like.

Also, it is directed to propose an image pickup apparatus in which adequate strength can be obtained also for business use, battery exchange is realized easily and operationality is satisfactory.

The most main feature of the image pickup apparatus according to the present invention lies in that there are provided with imaging means for forming a video signal of a subject according to a light inputted from a lens device; a first display device for displaying a video picture according to the video signal; and an image pickup apparatus body for housing the imaging means and also for having a handle which is extended in approximately parallel with a light axis of a lens system of the lens device on an upper portion thereof.

The image pickup apparatus of the present invention has a feature in which the first display device includes a flat planar monitor and a turning support mechanism for supporting the planar monitor on the image pickup apparatus body freely rotatably and it is made possible to turn the planar monitor approximately 180 degree by the turn of the turning support mechanism.

The image pickup apparatus of the present invention has a feature in which it is made for the planar monitor to take a reversing operation by the turn of the turning support mechanism, it is made possible for a display surface of the planar monitor and a non-display surface of the opposite side thereof to display selectively in the housing position of the planar monitor, at the same time the planar monitor includes a flat housing, a first main face of the housing is provided with a display surface of the planar monitor, and a second main face which is on the opposite side of the first main face is a non-display surface.

The image pickup apparatus of the present invention has a feature in which the display surface of the first display device is provided such that the front side in the light axis direction is heightened and inclined rearward.

The image pickup apparatus of the present invention has a feature in which the first display device whose posture can be changed is coupled to the handle freely rotatably by a rotational axis being extended to a parallel direction, an orthogonal direction or a direction inclined by an appropriate angle with respect to the light axis direction of the handle; at the same time, is made possible to take a turning operation and a reversing operation to the axis center line direction and to the orthogonal direction of the rotational axis; and it is made possible to arrange a display surface of the first display device or a non-display surface on the opposite side of the display surface on the handle selectively.

The image pickup apparatus of the present invention has a feature in which an operation button for operating the imaging means is arranged at a position of the handle covered by the first display device whose posture can be changed.

The image pickup apparatus of the present invention has a feature in which an operation button for operating the imaging means is arranged in the vicinity of a position on which the first display device of the handle is arranged and on a rear side in the light axis direction.

The image pickup apparatus of the present invention has a feature in which a second display device is provided rearward the handle of the image pickup apparatus body and approximately on the same axis of the handle and the second display device consists of viewfinder.

The image pickup apparatus of the present invention has a feature in which the viewfinder is arranged freely rotatably to an upper direction by a rotational axis provided on the handle.

The image pickup apparatus of the present invention has a feature in which the light axis of the viewfinder and the light axis of the lens system of the image pickup apparatus body are arranged by a predetermined distance and the viewfinder is arranged in an upper portion apart from the image pickup apparatus body.

The image pickup apparatus of the present invention has a feature in which a concave space is provided between an upper portion of a battery housing portion provided on a back face of the image pickup apparatus body and the image pickup apparatus body and it is constituted such that the battery is detachable by being unlocked.

The image pickup apparatus of the present invention has a feature in which a shoulder attachment which is mounted on the image pickup apparatus body detachably is provided and the shoulder attachment includes a shoulder attaching portion supported such that it can be approaching/departing with respect to the back face of the image pickup apparatus body.

The image pickup apparatus of the present invention has a feature in which the shoulder attaching portion includes a supporting arm supported elastically with respect to the back face of the image pickup apparatus body and a supporting piece supported freely rotatable at the tip of the supporting arm.

The image pickup apparatus of the present invention has a feature in which the supporting piece has approximately the same size with the back face of the image pickup apparatus body and is constituted to cover the back face of the image pickup apparatus body when the supporting arm is approached to the image pickup apparatus body by being shortened.

The image pickup apparatus of the present invention has a feature in which the supporting piece is provided with a through-hole for avoiding a contact with the battery mounted on the back face of the image pickup apparatus body.

The image pickup apparatus of the present invention has a feature in which the shoulder attachment includes a shoulder attachment body fixed on the image pickup apparatus body detachably and the shoulder attachment body is provided with a positioning portion for positioning the bottom portion of the image pickup apparatus body and a supporting arm housing portion which houses the supporting arm such that it can be taken in and out with respect thereto.

The image pickup apparatus of the present invention has a feature in which there are provided with imaging means for forming a video signal of a subject according to a light inputted from a lens device; a first display device and a second display device for displaying a video picture according to the video signal; and an image pickup apparatus body for housing the imaging means and also for having a handle which is extended in approximately parallel with a light axis of a lens system of the lens device on an upper portion thereof, wherein the first display device is provided on the front side in the light axis direction of the handle such that its posture can be changed and at the same time the second display device is provided on the rear side in the light axis direction of the handle such that its posture can be changed.

The image pickup apparatus of the present invention has a feature in which the first display device is a planar monitor housed in a flat monitor case having a display surface on one face, is made to be freely rotatable in the direction orthogonal to the light axis by centering around one side of the planar monitor and is made to be freely rotatable by centering around an axis perpendicular to the light axis and also approximately horizontal with the light axis in a state of turning in the orthogonal direction.

The image pickup apparatus of the present invention has a feature in which the first display device is constituted such that when the planar monitor is turned to the opposite side and returned to the housing position of the planar monitor so as to be folded, the display surface of the planar monitor is made to position on the upper face thereof.

Also, the image pickup apparatus of the present invention has a feature in which on the rear portion of the handle, the second display device is provided approximately on the same axis of the handle and the second display device consists of a viewfinder.

According to the image pickup apparatus of the present invention, it is constituted such that a first display device is provided integrally or by another member on the front side in the light axis direction of the handle in which the posture thereof can be changed, so that it is possible to arrange the first display device at the most conspicuous position when taking a picture by holding the handle and to improve operationality when taking a picture.

According to an image pickup apparatus of the present invention, the first display device is made to be a flat planar monitor, it is constituted such that the planar monitor is supported by a turning support mechanism, the planar monitor is turned approximately by 180 degree, so that it is possible to display the display surface of the planar monitor and the non-display surface of the opposite side thereof selectively and it is possible to carry out turning operation of the planar monitor easily by a manual operation.

According to an image pickup apparatus of the present invention, the planar monitor includes a flat housing, a first main face of the housing is made to be a display surface of the planar monitor, the first main face of the housing is provided with the display surface of the planar monitor, and a second main face of the side opposite to the first main face is made to be a non-display surface, so that it is possible in the housed position of the planar monitor to display the display surface of the planar monitor and the non-display surface of the opposite side thereof selectively and it is possible to attempt execution of a planar monitor protection.

According to an image pickup apparatus of the present invention, the display surface of the first display device is constituted such that the front side thereof is heightened and also the rear side thereof is made low and inclined rearward, so that it is possible to improve visibility of the display surface on an occasion when a picture is taken.

According to an image pickup apparatus of the present invention, the first display device is coupled through a rotational axis freely rotatably with respect to the handle and at the same time, the display surface and the non-display surface of the first display device can be arranged at the front portion of the handle by being selected, so that when it is necessary such as when taking a picture or the like, it is possible to make the display surface to serve for taking a picture or the like by turning it to the obverse side and when it is not necessary such as when it is not a time of taking a picture or the like, it is possible to protect the display surface by turning the non-display surface to the obverse side.

According to an image pickup apparatus of the present invention, it is constituted such that an operation button is arranged at a position of the handle covered by the first display device, so that when the operation button is covered by the first display device, the operation button cannot be used and therefore, it is possible to prevent an operational error of that operation button.

According to an image pickup apparatus of the present invention, it is constituted such that an operation button is arranged in the vicinity of the position on which the first display device of the handle is arranged and on the rear side in the light axis direction, so that it is possible to see the operation button approximately by the same eye line while seeing the display surface of the first display device and it is possible to carry out the button operation after seeing the display surface and the operation button approximately concurrently only by a small movement of the eye line.

According to an image pickup apparatus of the present invention, arrangement of a viewfinder is done on a handle which is a different body from the image pickup apparatus body installed with complicated electronic circuits and built-in structures, is basically formed strongly for being carried and also whose built-in structures are not relatively complicated, so that it is possible to make it very effective in simplification for the construction of that mounting portion and in assuring the mounting strength thereof.

According to an image pickup apparatus of the present invention, it is possible to house the mounting and turning mechanism of the viewfinder within the inside of the handle and it is possible to make it to be inconspicuous visually. Also, it is not necessary to provide construction for mounting the viewfinder in the image pickup apparatus body, so that it is possible to miniaturize the main body and attaching and detaching become easy also with respect to the repair of the viewfinder or the like.

According to an image pickup apparatus of the present invention, it is possible to limit the height of lifting the image pickup apparatus when taking a picture and taking a picture by folding the arm and by tightening the side becomes possible, so that it becomes possible to take a picture in a stable posture for many hours.

According to an image pickup apparatus of the present invention, an adequate space can be assured between the battery housing portion and the viewfinder at the upper portion, so that it is not necessary to turn the viewfinder when the battery is attached and detached and it is possible to make the exchange operation of the battery to be an easy-to-use approach.

According to an image pickup apparatus of the present invention, the shoulder attachment mounted on the image pickup apparatus body detachably is constituted such that the shoulder attachment can be approaching/departing with respect to the back face of the image pickup apparatus body, so that it is possible to make the shoulder attachment to be a simple construction and at the same time, the operation is easy and it is possible to take a picture by firmly fixing the image pickup apparatus.

According to an image pickup apparatus of the present invention, the shoulder attaching portion is constituted by a supporting arm and a supporting piece, so that the adjustment of projecting amount of the supporting piece is easy and it can be fixed at an arbitrary length freely and at the same time, it is possible to carry out angle adjustment of the supporting piece freely and it is possible to support the image pickup apparatus firmly by pressing it to an arbitrary position of the shoulder, the breast or the like of a user.

According to an image pickup apparatus of the present invention, the supporting piece is formed approximately in the same size as the back face of the image pickup apparatus body and the supporting piece is made to approach to the back face of the image pickup apparatus body by being shortened, so that it is possible to protect the operation button, the operation switch, the display device or the like which are provided on the back face thereof by covering them by the supporting piece and therefore, it is possible to prevent occurrence in which the operation button or the like is operated erroneously by being contacted with some object and trouble in which it is damaged or the like by hitting some object.

According to an image pickup apparatus of the present invention, a through-hole for avoiding contact with the battery is provided in the supporting piece, so that the whole image pickup apparatus can be repressed from increasing by pushing and shortening the supporting piece and by approaching it to the image pickup apparatus body and at the same time, contact with the battery projecting from the image pickup apparatus body is prevented and it is possible to repress the whole apparatus from growing in size.

According to an image pickup apparatus of the present invention, the shoulder attaching portion includes a shoulder attachment body and the shoulder attachment body is provided with a positioning portion with respect to the image pickup apparatus body and a supporting arm housing portion, so that it is possible to position the image pickup apparatus at a predetermined position of the shoulder attachment only by mounting the image pickup apparatus body on the positioning portion and at the same time, it is possible to prevent the supporting arm from projecting so as to become an obstructive when the supporting arm is shortened and it is possible to propose a shoulder attachment of a novel design without damaging the sense of beauty.

According to an image pickup apparatus of the present invention, it is constituted such that there is provided a first display device whose posture can be changed on the front side in the light axis direction of the handle and there is provided a second display device whose posture can be changed on the rear side in the light axis direction of the handle, so that it is possible to arrange the first display device at the most conspicuous position when taking a picture by holding the handle so as to carry out taking a picture by seeing the first display device and at the same time, it is also possible to carry out taking a picture by seeing the second display device after lifting it to the height of eyes, it is possible to correspond to the changes of an subject instantaneously while taking various postures and it is possible to improve operationality when taking a picture remarkably.

According to an image pickup apparatus of the present invention, the first display device is constituted by a planar monitor and is turned centering around one side of the planar monitor, so that it is possible to direct the display surface of the planar monitor freely to any directions of the top and bottom, the back and forth and the right and left directions thereof, it is possible to correspond suitably with respect to taking pictures by all of postures and it is possible to propose a picture screen of a huge screen and easy to look at.

According to an image pickup apparatus of the present invention, further, the planar monitor is turned to the opposite side so as to be returned to the housed position and folded therein, so that it is possible to display the display surface and the non-display surface at the housed position by selecting it arbitrarily and it is possible to make the display surface to be exposed so as to display the video or the like of the subject when it is necessary and to attempt protection of the planar monitor by displaying the non-display surface when it is unnecessary.

Also, according to an image pickup apparatus of the present invention, a viewfinder which is a second display device is provided at the rear portion of the handle, so that it is also possible to carry out taking a picture of a subject by using that viewfinder and it is possible to use two display devices of the planar monitor and the viewfinder if it is necessary and therefore, taking a picture is easy and it is possible without a state as much as possible in which a user must take an improper posture to propose an apparatus for taking a picture in which tiredness is only a little.

BRIEF DESCRIPTION OF DRAWINGS

FIG. 17 is an explanatory diagram showing a state in which the back face of the case body is covered by a supporting piece of the shoulder attachment shown in FIG. 15 or the like;

BEST MODE FOR CARRYING OUT THE INVENTION

Figure 1:
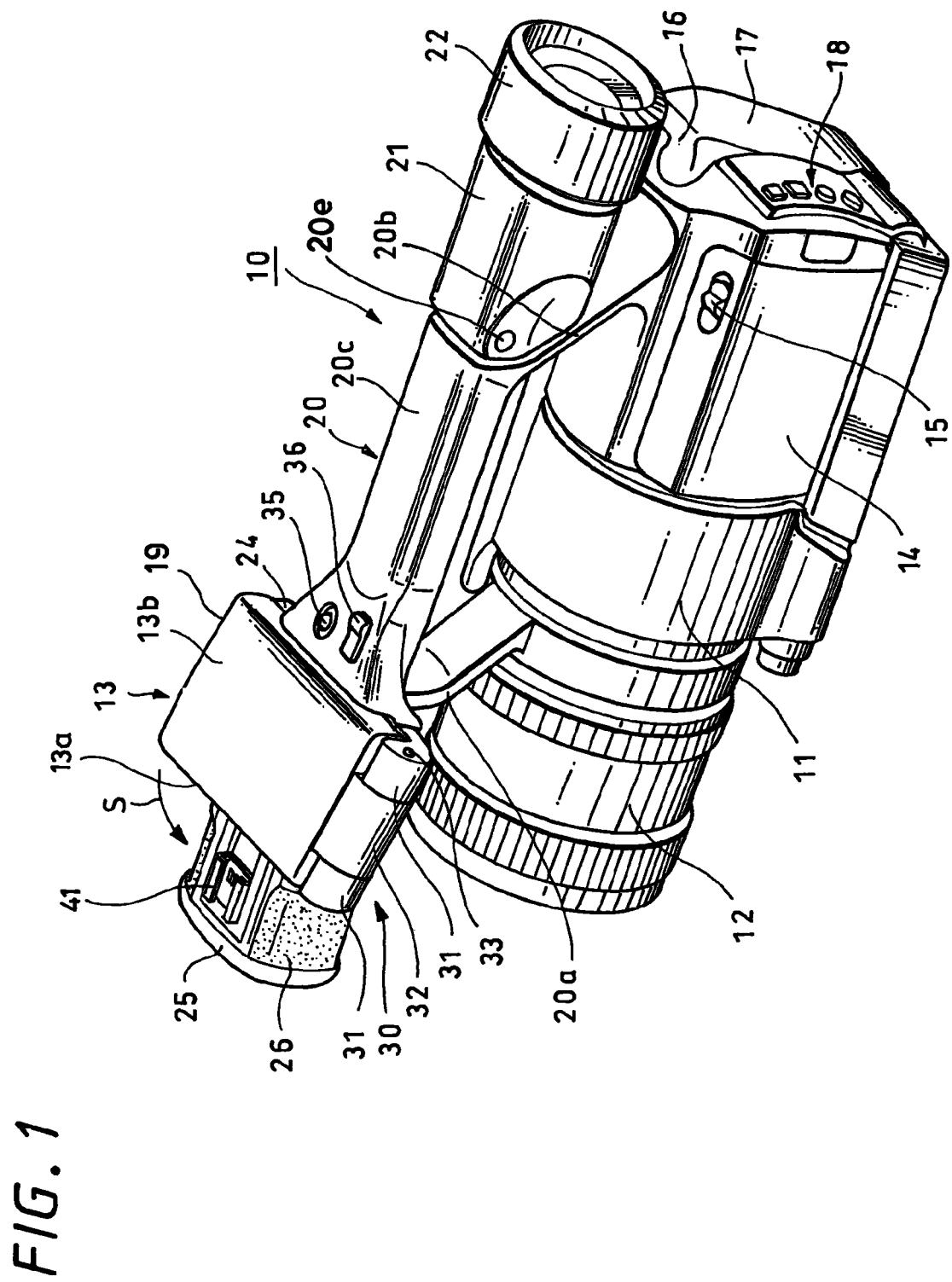
FIG. 1 shows an example of a first exemplified embodiment of an image pickup apparatus according to the present invention and is a perspective view of a state in which a display surface of a first display device is made to face to a pedestal portion of a handle and a non-display surface thereof is brought into sight as an obverse side.

An object wherein it never happens that the first and the second display devices become obstructive for taking a picture when taking a picture and, furthermore, the display surface can be looked at favorably and operationality of the operation button is improved was realized by devising the arrangement of the first and the second display devices and the mounting construction thereof and the like.

Also, it is possible to make the design to be one which is not known in. the past in which operationality is favorable, adequate strength is obtained also as a business use though it is compact and exchange of the battery is carried out easily.

INVENTIVE EXAMPLE 1

FIG. 1 to FIG. 19 show exemplified embodiments of the present invention. More specifically, FIGS. 1 to 6 are video camera diagrams showing a first practical example of an image pickup apparatus according to the present invention, FIG. 7 to FIG. 13 are explanatory diagrams showing use states of the video camera, FIG. 14 is a video camera diagram showing a second practical example of a mounting construction of a display device and FIG. 15 to FIG. 19 are diagrams showing one practical example of a shoulder attachment suitable to be used in the image pickup apparatus of the present invention.

A video camera 10 shown in FIG. 1 to FIG. 6 show one embodiment of an image pickup apparatus according to the present invention, wherein it is constituted such that a digital video cassette (hereinafter, referred to as "DV cassette") using a tape recording medium as an information recording medium is used and an optical picture is converted to an electrical signal by a CCD (charge coupled device) so as to be able to be recorded on a DV cassette and be displayed on a display device of a liquid crystal display or the like. However, the image pickup apparatus of the present invention is not limited by this configuration and it is applicable to an electronic still camera or other image pickup apparatus.

Further, it is not limited by the DV cassette as an information recording medium and it is needless to say that analog video cassette or other tape recording medium can be used, and a disc shaped recording medium such as a DVD (Digital Versatile Disc), a CD-ROM, other recordable optical disc, a magnetic optical disc, a magnetic disc or the like and further, other recording medium such as a semiconductor recording medium or the like can be applicable.

This video camera 10 is constituted by a case body 11 of a hollow housing which shows one embodiment of the image pickup apparatus body, a lens device 12 mounted on the front face of the case body 11 in a manner to be projected therefrom, imaging means for forming a video signal of a subject according to a light inputted from the lens device 12, a first display device 13 and a second display device 21 for displaying videos according to video signals formed by the imaging means or information recorded beforehand on an information recording medium (memory device of imaging means or DV cassette), and the like.

Here, it will be defined with respect to a video and a picture in the present invention. It is assumed in the present invention that an image of every one scene indicated on the display surface of the first display device 13 or the second display device 21 is referred to as "picture" and a set of arbitrary numbers of the pictures is referred to as "video".

The imaging means of the video camera 10 is constituted by a cassette holder which is housed inside of the case body 11 and on which a DV cassette is mounted freely detachably though it does not appear in the drawings, a recording and reproducing apparatus for carrying out recording (writing-in) and reproducing (reading-out) of an information signal by driving the tape recording medium of the DV cassette mounted on the cassette holder, a control device for carrying out a drive control of the recording and reproducing apparatus or the like, and the like. The CCD showing one embodiment of the imaging means is arranged rearward on the light axis of the lens device 12 and information converted to an electrical signal by this CCD is recorded on the DV cassette.

It is made possible for a cassette loading slot of the cassette holder to project externally from an opening portion provided in the case body 11 and the opening portion is made to be freely openable and closable by an opening and closing lid 14 mounted on the case body 11 freely rotatably. A reference numeral 15 is a lid opening button for opening the opening and closing lid 14 by releasing a lock of the opening and closing lid 14. By slide-operating the lid opening button 15, it is turned centering around an axis which supports the bottom portion of the opening and closing lid 14 freely rotatably and the upper potion of the opening and closing lid 14 is opened to the side direction of the case body 11.

A handle 20 is provided on the case body 11 integrally upward by being extended to the front and rear direction which is the light axis direction of the lens device 12. The handle 20 is constituted by a front leg portion 20a provided to stand at the front side upper portion of the case body 11, a rear leg portion 20b provided to stand at the rear side upper portion of the case body 11 and a grasping portion 20c which is extended approximately in parallel with the light axis of the lens device 12 and at the same time couples between upper edges of the front and the rear leg portions 20a and 20b. The bottom portion of the front leg portion 20a and the rear leg portion 20b is formed so as to be inclined to the front side and an electronic viewfinder 21 showing one embodiment of the second display device is mounted on an upper portion of the rear leg portion 20b.

The electronic viewfinder 21 is provided so as to project rearward approximately on the same axis in the axis direction of this grasping portion 20c from the rear portion of the grasping portion 20c of the handle 20 which is installed on the upper portion of the light axis of the lens device 12 approximately in parallel therewith. Then, an eye cup 22 is mounted at the tip portion thereof. The electronic viewfinder 21 is supported freely rotatably on the rear portion of the grasping portion 20c of the handle 20 on the front side of the light axis direction and the eye cup 22 side is constituted to be rotatable upward approximately by 80 degree.

Figure 2:
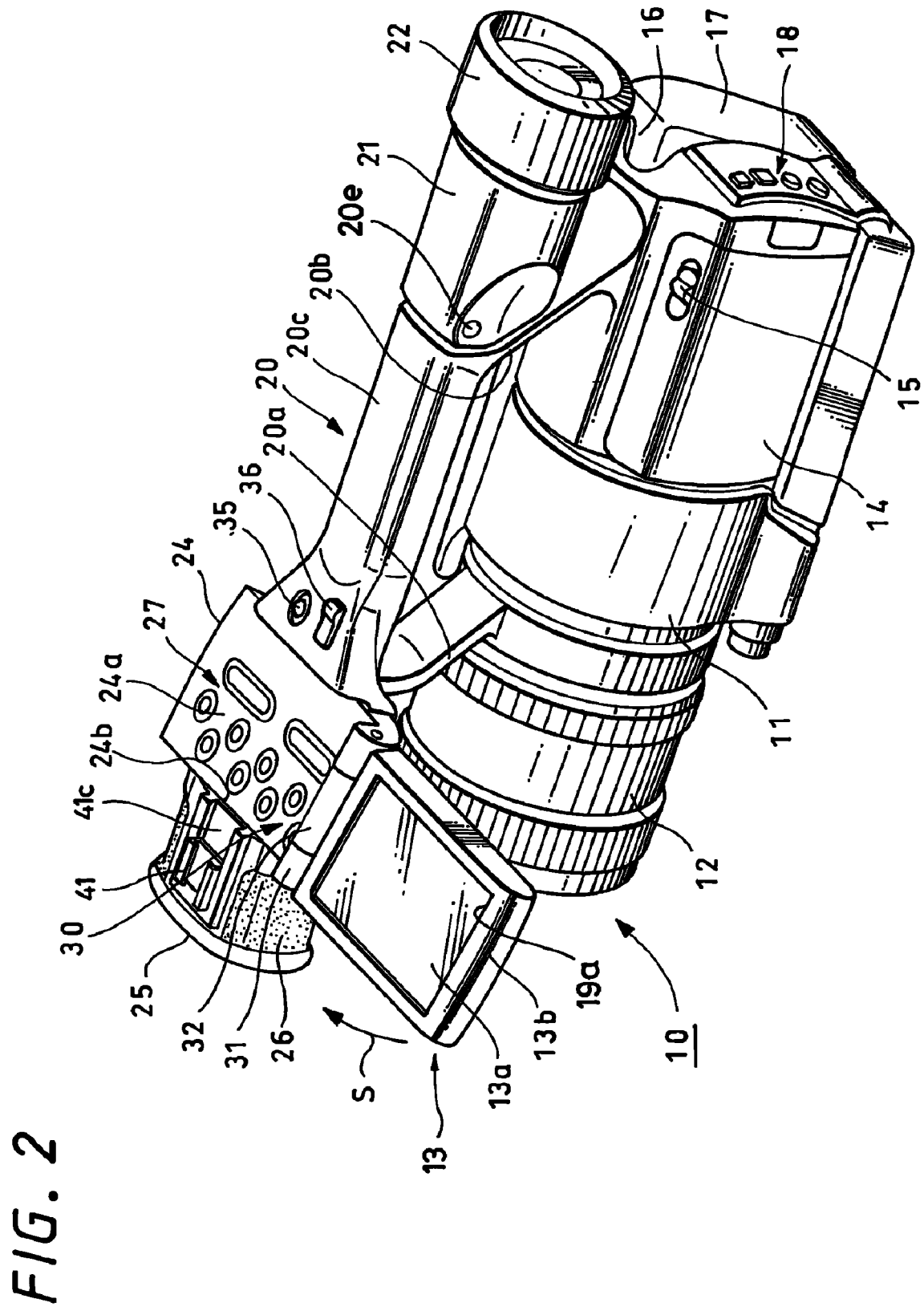
FIG. 2 shows an example of a first exemplified embodiment of an image pickup apparatus according to the present invention and is a perspective view of a state in which a first display device is turned in a right and left direction by 180 degree and a display surface thereof is brought into sight as an upper face.
Figure 5:
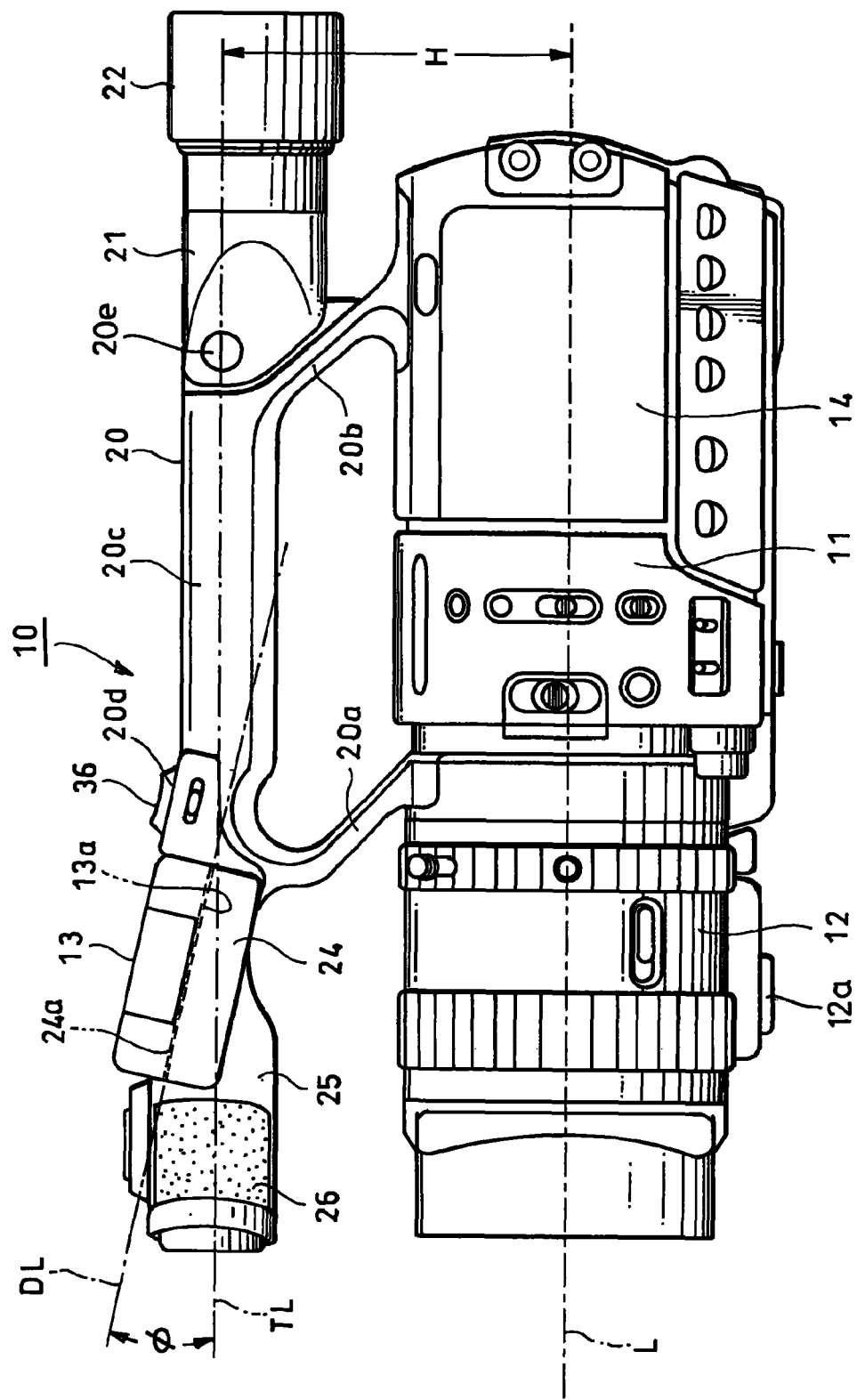
FIG. 5 shows an example of a first exemplified embodiment of an image pickup apparatus according to the present invention and is an explanatory diagram explaining a relation of the image pickup apparatus body, the handle, the first display device and a second display device.

The electronic viewfinder 21 is to be mounted, as shown in FIG. 1 and FIG. 2, on the upper portion of the rear leg portion 20b of the handle 20 which is constituted so as to become a structure obtaining an adequate strength. Then, as shown in FIG. 5, misalignment amount between the axis 20e of the handle 20 and the light axis of the electronic viewfinder 21 is very small, so that offset of the axis 20e of the handle 20 with respect to the light axis of the lens device 12 becomes approximately H and a relatively large space can be assured.

Figure 23:
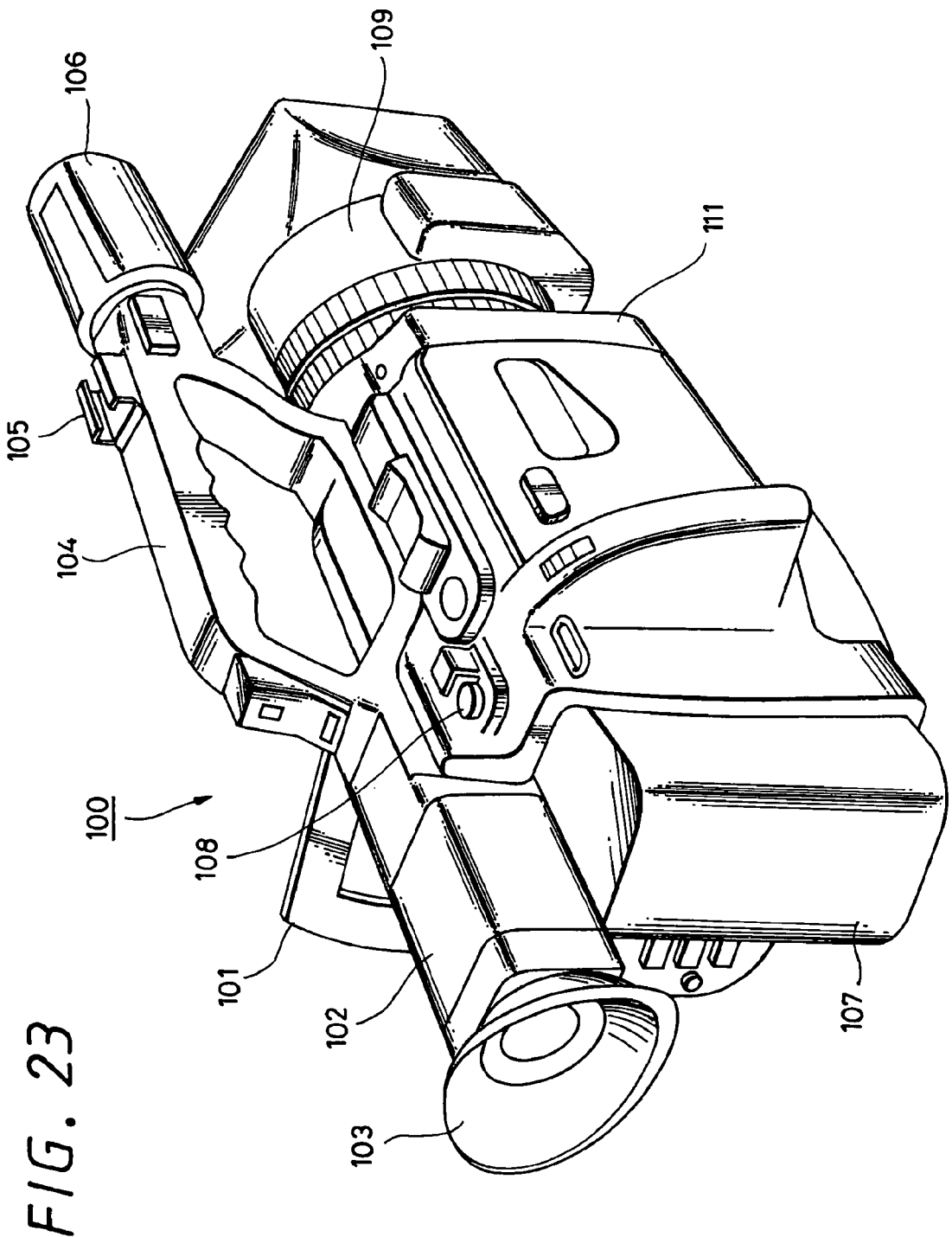
FIG. 23 shows an image pickup apparatus in the past and a perspective view seeing a viewfinder from the back face side thereof by making it in a horizontal state.
Figure 24:
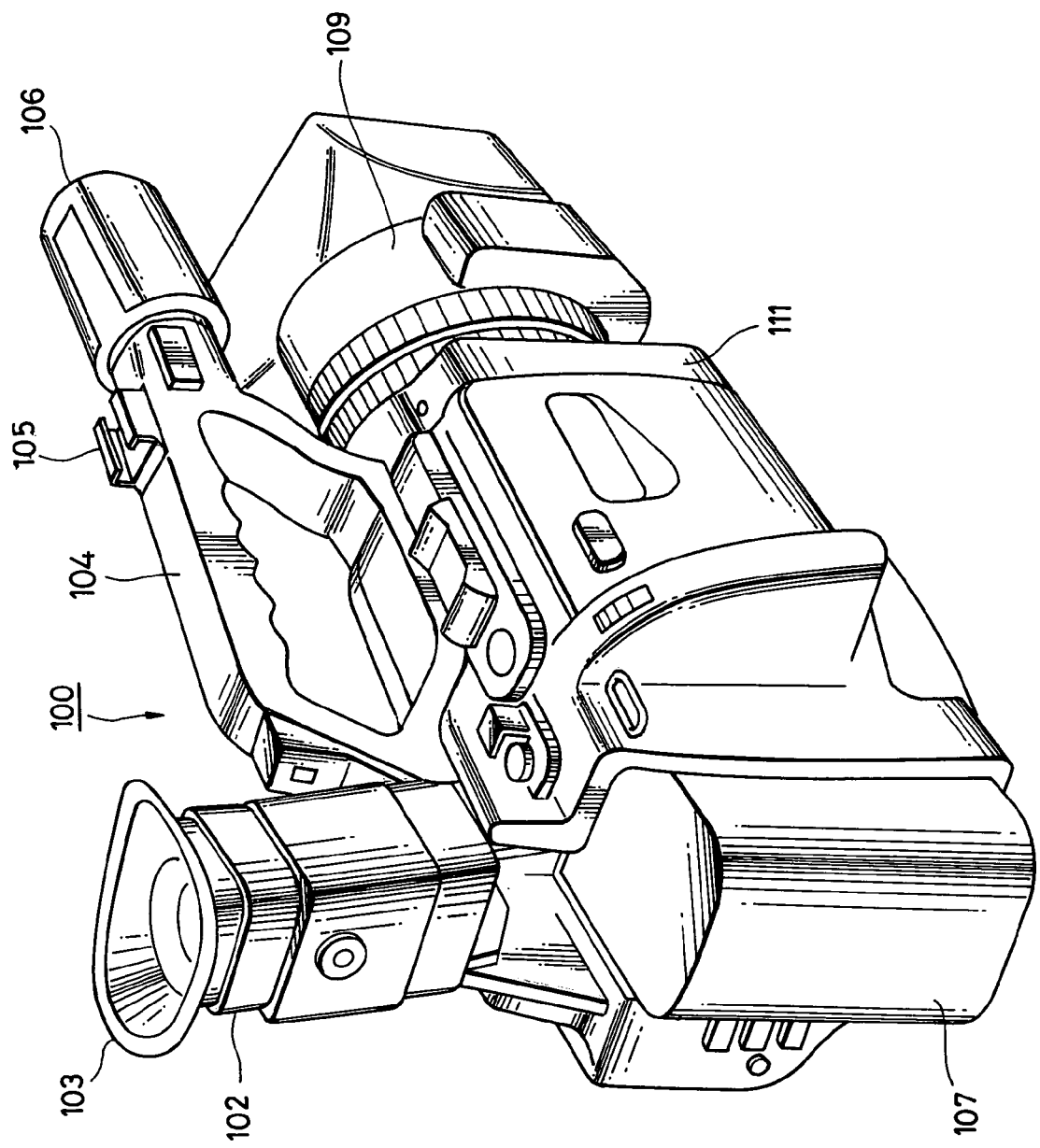
FIG. 24 shows an image pickup apparatus in the past and a perspective view seeing a state from the back face side thereof where a viewfinder is turned and directed upward.

Also, such as the image pickup apparatus 100 shown in FIG. 23 and FIG. 24 as an example in the past, it never happens that limitation with respect to the space for housing the turning mechanism of the electronic viewfinder 102 in the case body 111 should be taken into account, so that it is possible to form a turning mechanism of an electronic viewfinder obtaining an adequate strength on the upper portion of the rear leg portion 20b of the handle 20.

On the opposite side of the opening and closing lid 14 and on the back face of the case body 11, there is provided a battery housing portion 16 consisting of a concave depression portion. A battery 17 as a power supply is mounted detachably on this battery housing portion 16. Then, on the back face of the case body 11 and on the opening and closing lid 14 side, there are provided a lot of operation buttons (for example, volume adjustment button, white balance button, mode switching button, etc.) 18 for operating the imaging means.

Next, it will be explained with respect to the battery housing portion 16 with reference to FIG. 1 and FIG. 6 to FIG. 8. It should be noted that the battery 17 used here is a battery containing a plural number of secondary batteries of such as, for example, nickel-cadmium battery, nickel-hydrogen battery, lithium-ion battery or the like which can be charged and discharged in a case forming approximately a rectangular parallelepiped. On one face of this case, a power supply terminal which is not shown and an engagement claw to the video camera 10 main body are provided.

Figure 6:
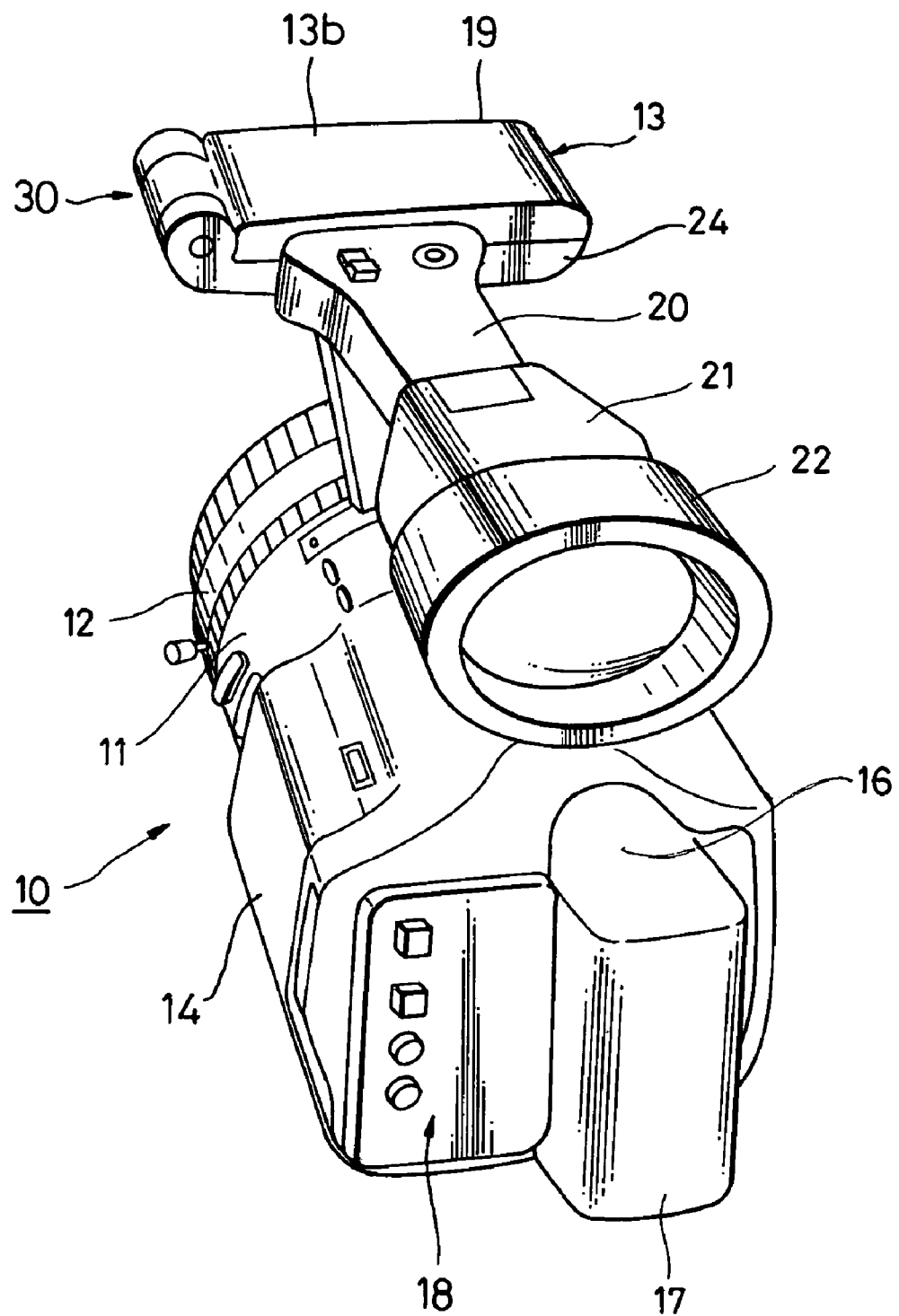
FIG. 6 is a perspective view of a use state of the image pickup apparatus shown in FIG. 1 seen from the back face side thereof.
Figure 7:
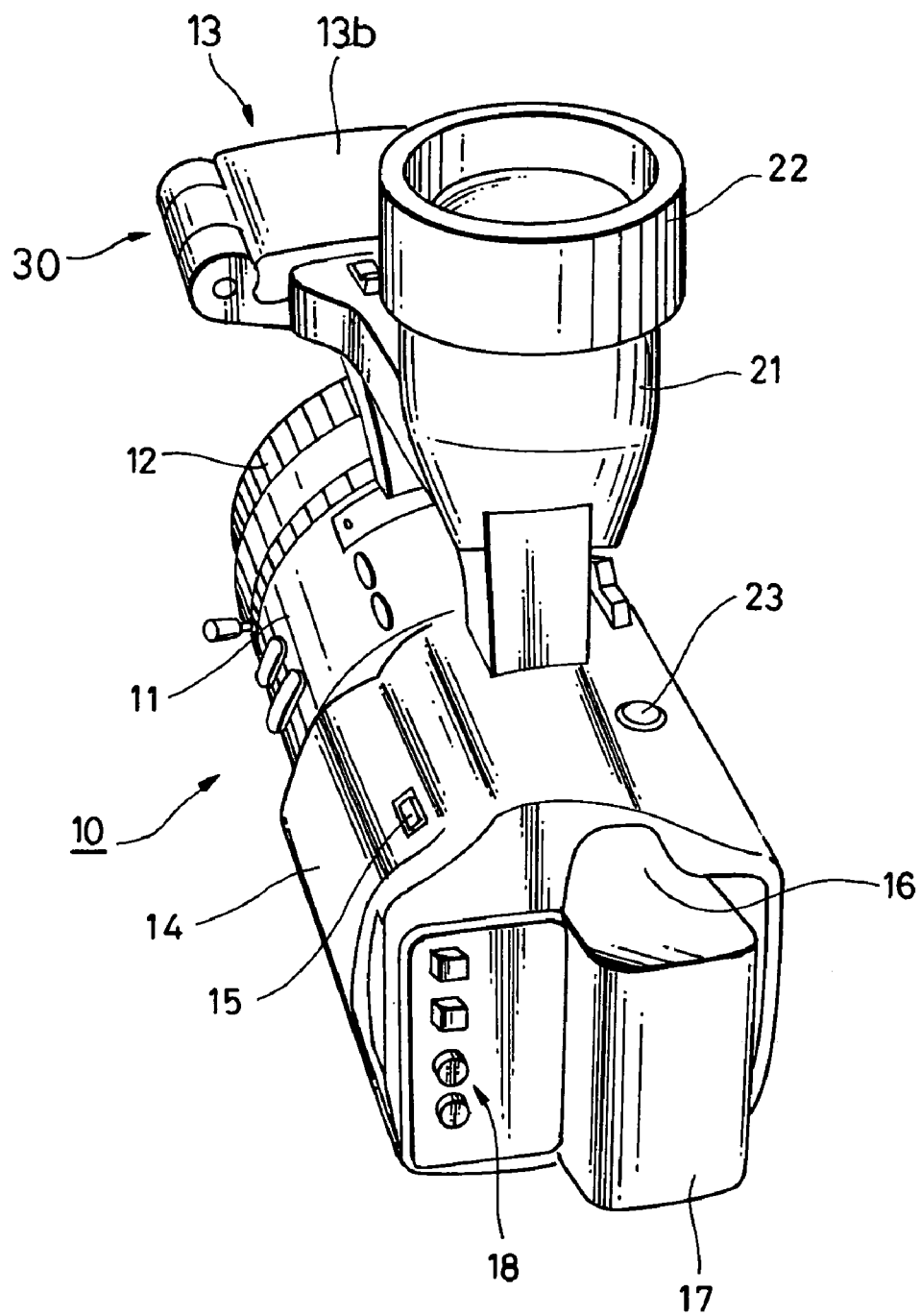
FIG. 7 shows a use state of the image pickup apparatus shown in FIG. 1 and is a perspective view seeing a state in which an electronic viewfinder is turned upward from the back face side thereof.

FIG. 6 and FIG. 7 is a perspective view seeing the video camera 10 shown in FIG. 1 from the back face direction of the case body 11. FIG. 6 is a diagram showing a normal state in which the light axis of the electronic viewfinder 21 exists approximately on the same axis with the axis center of the handle 20 and FIG. 7 is a diagram showing a state in which the electronic viewfinder 21 is turned obliquely upward. Also, FIG. 8 shows a state in which the battery 17 mounted on the battery housing portion 16 shown in FIG. 7 is detached.

Figure 8:
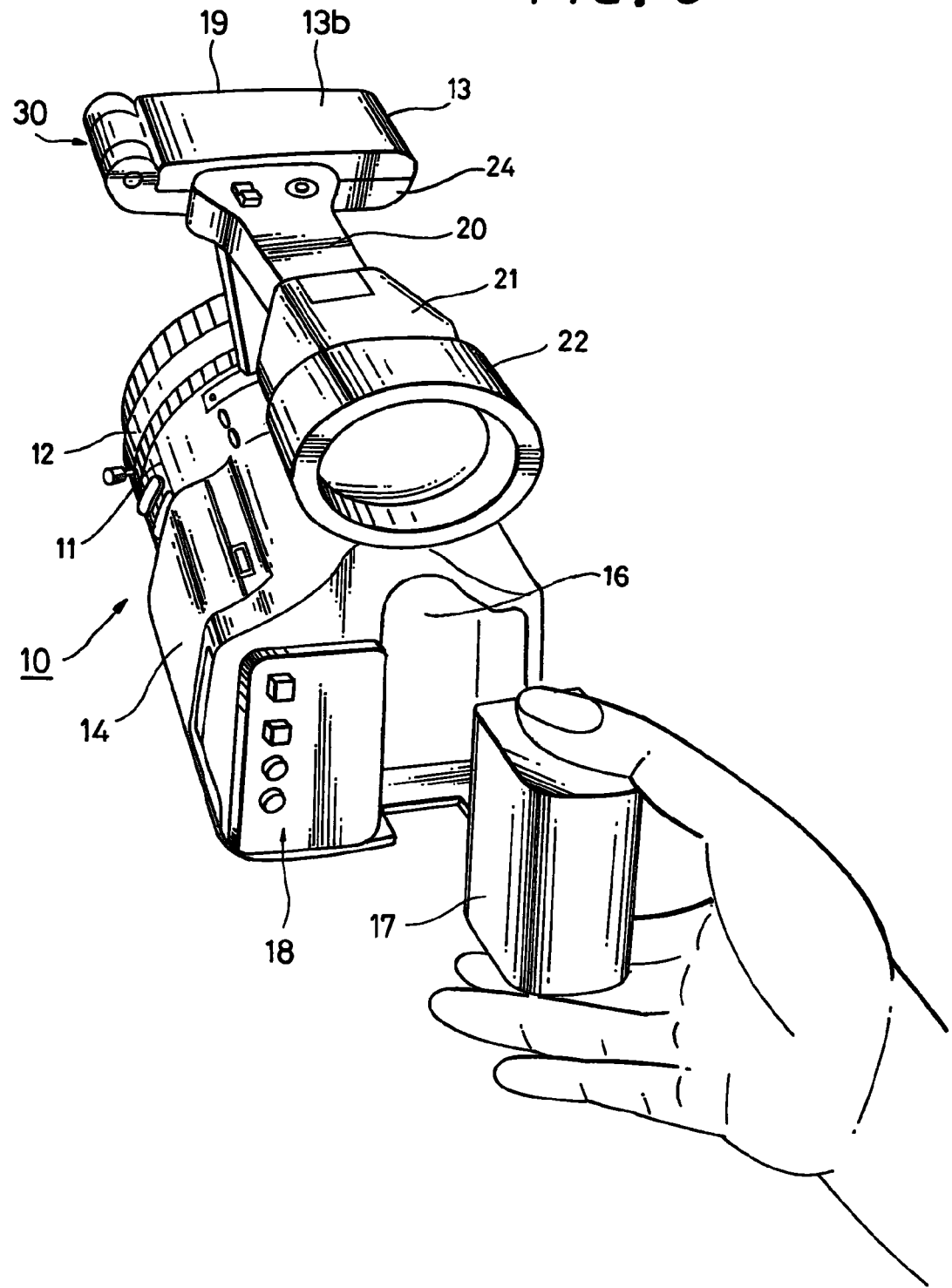
FIG. 8 shows a use state of the image pickup apparatus shown in FIG. 1 and is a perspective view seeing a state in which a battery is detached from the state of FIG. 7 from the back face side thereof.

As shown in FIG. 6 and FIG. 7, the battery housing portion 16 is provided on the back face of the case body 11 and it is constituted such that the shape of the opening thereof is a rectangle a little bit larger than the size of the battery 17 and has a margin such that it can shift the housed battery 17 to an upper direction and, as shown in FIG. 8, it is made to be a shape having a concave portion having a size to which a finger can be inserted at the upper portion and the bottom portion of the battery 17. Then, the depth thereof is formed to be such a size that the battery can be fixed without jumping out from the back face of the case body 11 when the minimum capacity of the battery 17 is housed. Further, there are provided, on the wall surface at the far end of the battery housing portion 16 in the depth direction, an engagement means with the engagement claw of the battery 17 and a plurality of electrically receiving terminals are provided though they are not shown.

The exchange of the battery 17 can be also carried out in a state in which the electronic viewfinder 21 exists approximately on the same axis as the axis center of the handle 20 shown in FIG. 5 and is not turned and also can be carried out in a state in which it is turned upward as shown in FIG. 7. More specifically, it can be carried out in any one of the postures while the setting when taking a picture is maintained. First, at the battery housing portion 16 of the case body 11, fingers are inserted into notches provided at the top and bottom of the battery 17 and next, the battery 17 is grasped. Then, as shown in FIG. 7, the battery 17 is unlocked upward while the lock release button 23 of the battery 17 is being pushed, an engagement claw which is not shown of the battery housing portion 16 is unloosen and the battery 17 is finally pulled out.

A state when this battery 17 is grasped by the hand and detached is shown in FIG. 8. In this case, owing to a concave portion provided at the top and bottom of the battery housing portion 16, it is possible to grasp the battery 17 firmly and unloosen it without turning the electronic viewfinder 21. Then, another battery 17 for which charging was finished is grasped by the top and bottom thereof and is inserted into the battery housing portion 16, and the battery 17 is engaged to the engagement claw according to a reversed procedure with the previously mentioned one and the battery exchange operation will be completed.

As described above, according to the video camera 10 arranged with the electronic viewfinder 21, they will be arranged by taking an adequate distance between the electronic viewfinder 21 and the battery housing portion 16 even in a normal use state in which, as shown in FIG. 1 to FIG. 6 and FIG. 8, the electronic viewfinder 21 of the video camera 10 is approximately on the same axis as the axis center of the handle 20, and an adequate space for grasping the battery is assured at the upper portion of the battery 17, so that it is possible to carry out the exchange operation of the battery 17 smoothly regardless of whatever the turning state of the electronic viewfinder 21 is.

In this regard, according to the image pickup apparatus 100 in the past shown in FIG. 23, the electronic viewfinder 102 is arranged such as overhanging the upper portion of the battery 107 and the battery 107 exchange is difficult unless the electronic viewfinder 102 is turned as shown in FIG. 24 and in particular, the exchange was difficult for the battery 107 having thin thickness, because there is no handhold thereon. On the contrary, according to the image pickup apparatus provided with arrangement construction of the electronic viewfinder 21 of the present practical example, it is possible to carry out the exchange operation of the battery 17 easily and it becomes a big advantage for a business use.

More specifically, as shown in FIG. 6, a space which becomes a concave portion for a finger insertion is provided with on the left side of the upper portion of the battery 17 respect to the case body 11, so that it was made possible to attach and detach the battery 17 certainly and also easily by attaching a finger at the upper portion of the battery 17 which exists at a recess position with respect to the case body 11 and by holding the battery 17 firmly and sliding it. Also, though it is not shown here, even if the thickness of the battery 17 is thin and it is a battery in which the outer shape after mounting thereof is housed approximately completely within the outer shape of the main body of the video camera 10, it can be used without any problem at all, because an adequate space for grasping the battery 17 is assured in the battery housing portion 16 of the case body 11.

Also, as shown in FIG. 1 to FIG. 5, there are provided, on the front edge portion of the handle 20, a pedestal portion 24 continuous with the tip of the grasping portion 20c and a projection portion 25 continuous with the edge of the pedestal portion 24 and projecting forward in the light axis direction. The projection portion 25 consists of a hollow shaped portion opened to the front direction and right and left side direction and a microphone 26 is contained in the inside thereof.

Further, the pedestal portion 24 is formed relatively hugely such as throwing out to the both sides in the direction intersecting the light axis direction and a concave depression portion opened to the upper face is provided. On the pedestal portion 24, a lid body having an operation button group 27 consisting of a lot of operation buttons is fit and fixed integrally.

The upper face of the lid body mounted on the pedestal portion 24 is formed such as being inclined rearward in which the front side of the light axis direction is heightened. In this manner, the eye line of the photographer laying and holding the video camera 10 in front of his body is made to become an angle close to perpendicular with respect to the lid body face. It is possible for the concrete content of the operation button group 27 provided on this lid body to cite, for example, a playback button, a stop button, a fast forward button, a rewind button, an instant stop button, a sound volume adjusting switch, a back light switch and the like.

On one of the side portion of this pedestal portion 24, there is mounted a planar monitor 13 consisting of a liquid crystal display, a video monitor display or the like showing one embodiment of the first display device through a rotation supporting portion 30 so as to be able to turning-operate and reversing-operate. The planar monitor 13 is provided with a monitor case 19 including a display surface 13a on which a video is displayed and an opening portion 19a which makes the display surface 13a to be exposed and the monitor case 19 is coupled with the rotation supporting portion 30. The opposite side face with respect to the opening portion 19a of the monitor case 19 is made to be a non-display surface 13b of the planar monitor 13.

The rotation supporting portion 30 is constituted by a first turning portion enabling the planar monitor 13 to turn to a right and left direction S which is a direction orthogonal to the light axis direction with respect to the pedestal portion 24 and a second turning portion which enables the planar monitor 13 to turn to a front and rear direction T which is the light axis direction.

The first turning portion is constituted by a pair of bearing portion 31 and 31 provided by a predetermined distance apart on one side portion of the pedestal portion 24, a bearing piece 32 intervening between both the bearing piece portions 31 and 31 and a first rotational axis 33 passing through these of the pair of bearing portions 31 and 31 and the bearing piece 32. It is constituted with respect to the direction orthogonal to the axis center line direction of the first rotational axis 33 such that the planar monitor 13 can be turned to the right and left direction S by an angle region of approximately 180 degree. Accordingly, it is possible for the planar monitor 13 to take a display "closing" state in which, as shown in FIG. 1, the non-display portion 13b of the opposite side to the display surface 13a appears as the obverse side and a display "open" state in which, as shown in FIG. 2, the planar monitor 13 is turned by 180 degree to the right and left direction so as to make the display surface 13a to appear as the obverse side.

The second turning portion is constituted by the bearing piece 32, a second rotational axis which is not shown and is provided to stand on the bearing piece 32, and a turning frictional mechanism which enables the planar monitor 13 to be held by an arbitrary angle by generating a frictional force between the second rotational axis and the case portion 13b though it is not shown. The second rotational axis is extended to the direction orthogonal to the axis center line direction of the first rotational axis 33 and, as shown in FIG. 3, it is constituted such that the planar monitor 13 can be turned to the front and rear direction T in an angle region of approximately 270 degree.

Figure 3:
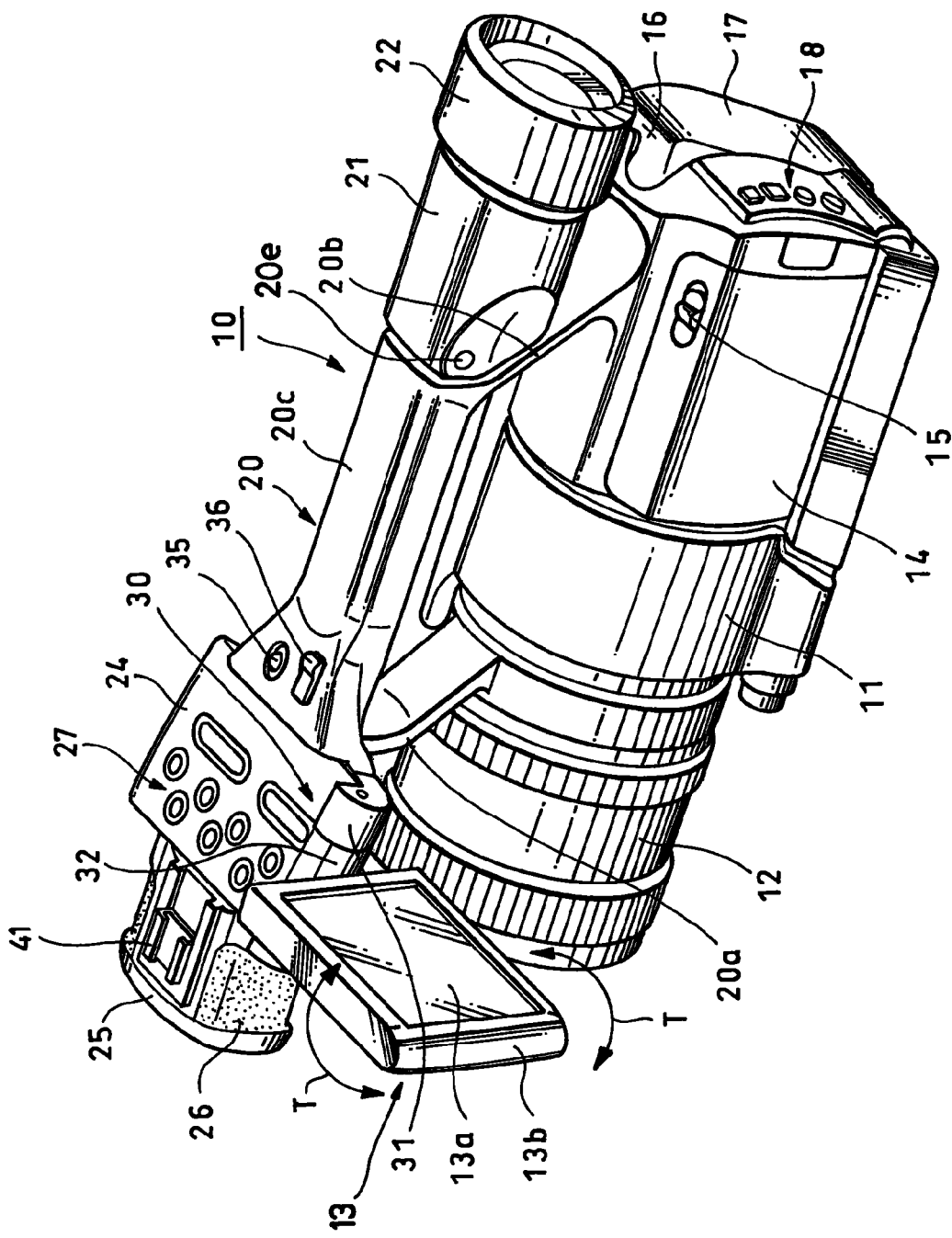
FIG. 3 shows an example of a first exemplified embodiment of an image pickup apparatus according to the present invention and is a perspective view of a state in which the first display device is turned rearward by 90 degree from the state shown in FIG. 2 and the display surface is directed to a photographer side.

Accordingly, the planar monitor 13 can take a state in which the non-display surface 13b appears upward (display surface 13a is downward) and a state in which the display surface 13a is directed to the front face by turning to the reverse direction by 270 degree from that state (state of taking a self picture), as shown in FIG. 2, from the state in which the display surface 13a appears upward and by way of a state (normal state of taking a picture) shown in FIG. 3 in which it is turned rearward by 90 degree so as to make the display surface 13a to be directed to the back face and further, by turning it rearward by 90 degree.

Figure 4:
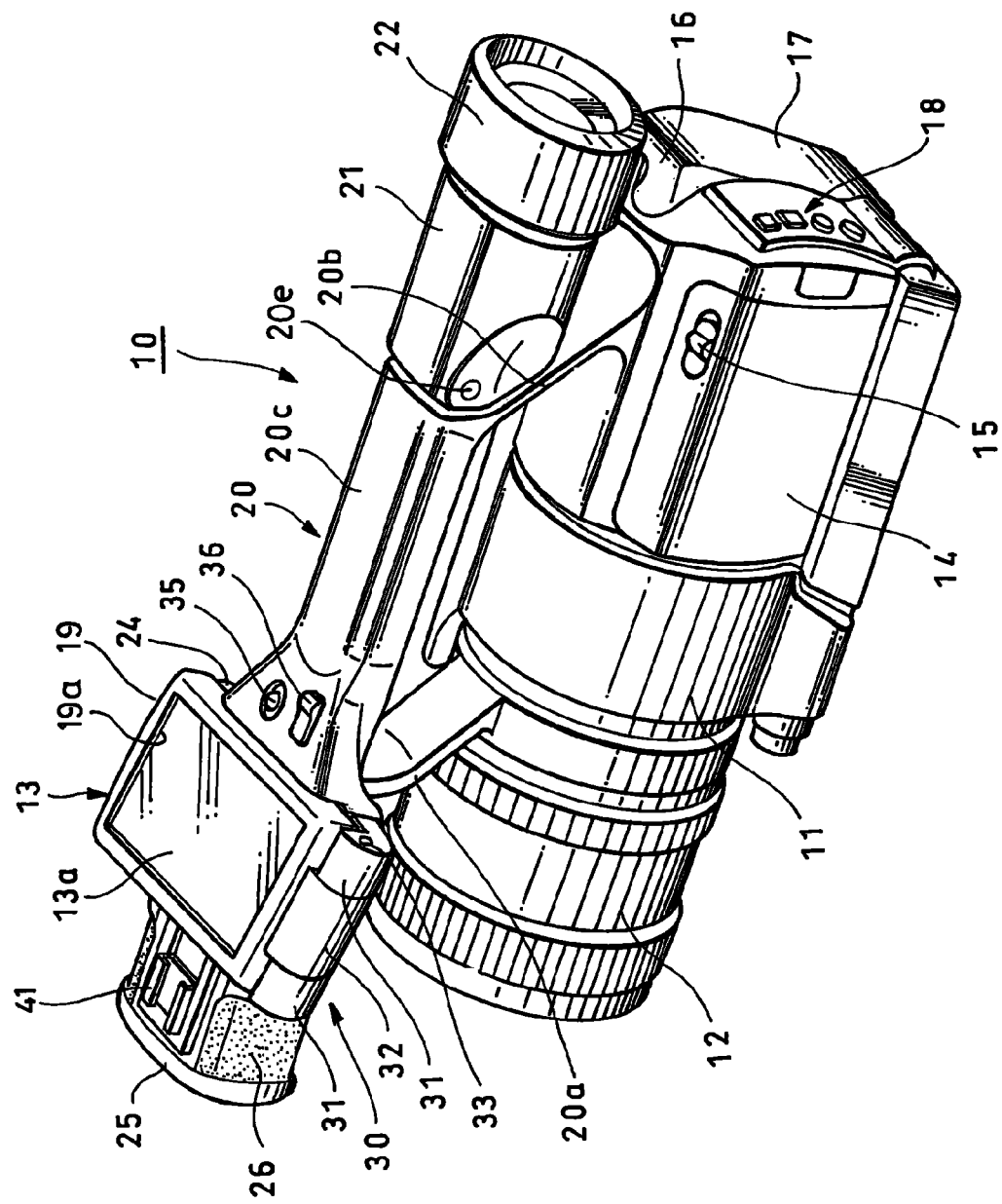
FIG. 4 shows an example of a first exemplified embodiment of an image pickup apparatus according to the present invention and is a perspective view of a state in which the first display device is turned further rearward by 90 degree from the state shown in FIG. 3, thereafter turned to the pedestal side thereof by 180 degree and the display surface is directed upward.

Also, the planar monitor 13 can take, as shown in FIG. 4, a state in which the display surface 13a appears upward by overlapping the planar monitor 13 on the pedestal portion 24 from the state in which the display surface 13a is directed downward so as to make the non-display surface 13b to appear upward by turning it to the right and left direction by 180 degree. Here, it is constituted when it is in a state in which the display surface 13a of the planar monitor 13 is directed to the subject (state of taking a self picture) such the picture is to be reversed automatically through an activation of a change-over switch.

In the vicinity of the planar monitor 13 supported by the pedestal portion 24 in this manner such that the posture thereof can be changed and at the front edge portion of the grasping portion 20c of handle 20, there are provided a recording button 35 showing one embodiment of the operation button for operating the imaging means and a zoom button 36 showing one embodiment of the operation button for operating the lens device 12.

Figure 9:
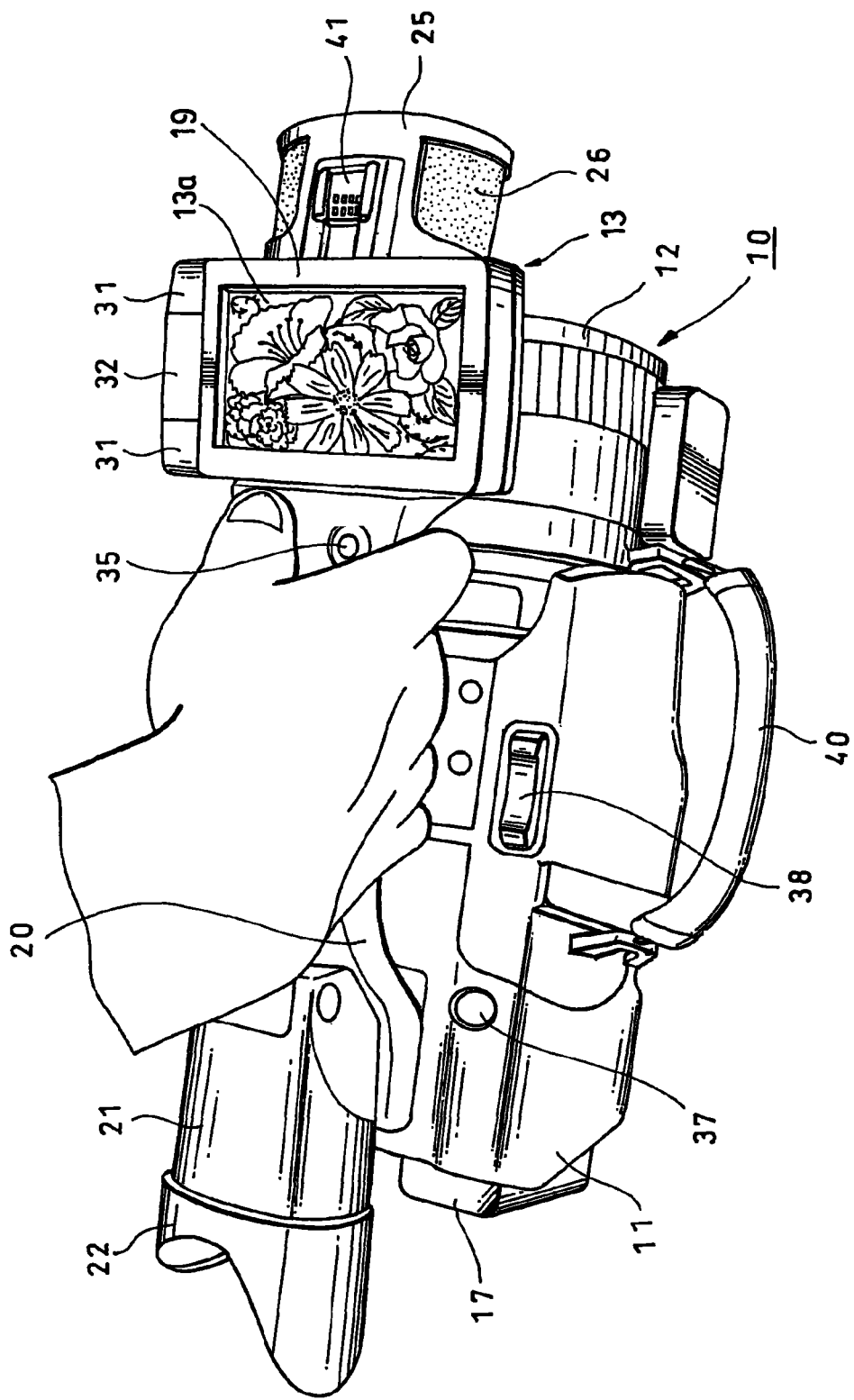
FIG. 9 shows a use state of the image pickup apparatus shown in FIG. 1 and is a perspective view of holding a handle.
Figure 10:
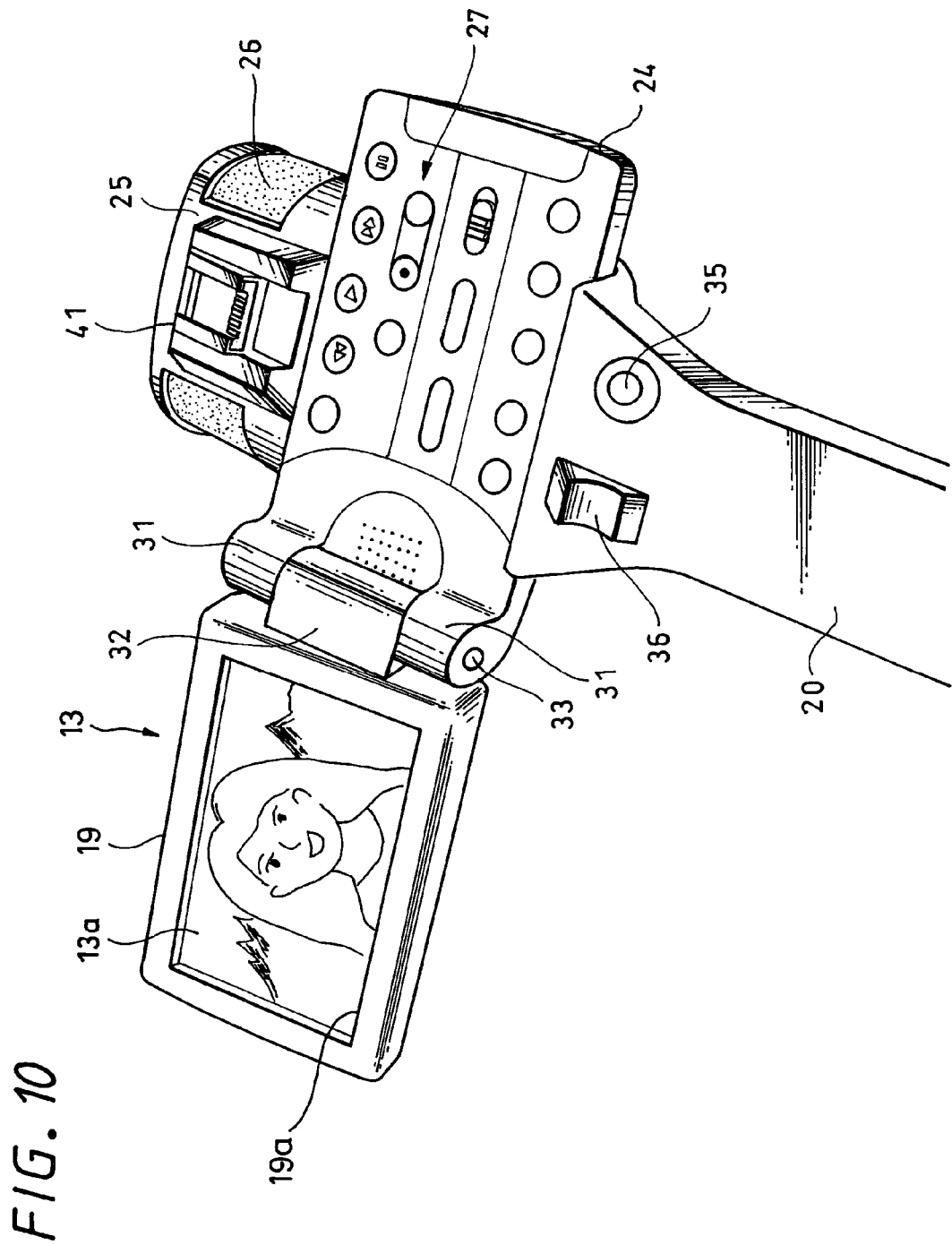
FIG. 10 shows a use state of the image pickup apparatus shown in FIG. 1 and is an explanatory diagram in which the display surface of the first display device is enlarged.

The recording button 35 and the zoom button 36 are arranged horizontally and, as shown in FIG. 9, are set to be in the position in which both of them can be operated by a thumb without changing how to hold it in a state where the handle 20 is held by the hand. These of the recording button 35 and the zoom button 36 are a second recording button and a second zoom button provided on the handle 20 in order to improve operationality. Therefore, a first recording button 37 and a first zoom button 38 are provided at the upper portion on the side face of the side opposite to the opening and closing lid 14 of the case body 11 individually independently with respect to the second recording button and the second zoom button.

A reference numeral 40 shown in FIG. 9 designates a hand belt for preventing failure in holding or the like of the video camera 10. Also, a reference numeral 41 shown in FIG. 9 and FIG. 10 designates a shoe accessory to which a flash unit or the like is to be mounted freely detachably.

The video camera 10 having such a constitution can execute a preferable imaging operation or the like, for example, by such a procedure as below. First, in a state of FIG. 1, the planar monitor 13 is stored in the pedestal portion 24 of the handle 20 and the non-display surface 13b of the side opposite to the display surface 13a is exposed on the surface. Therefore, the display surface 13a faces to the operation button group 27 inward like overlapping therewith, so that it is possible to protect the display surface 13a absolutely.

By turning the planar monitor 13 to the right and left direction S approximately by 180 degree from the state of FIG. 1 of the video camera 10 centering around the first turning portion of the rotation supporting portion 30, it is possible to direct the display surface 13a upward by projecting the planar monitor 13 to the side direction as shown in FIG. 2. In this state, it is possible to confirm the state of the subject by looking at the display surface 13a of the planar monitor 13. Also, the operation button group 27 provided on the pedestal portion 24 is to be exposed, so that it is possible to operate the imaging means of the video camera 10 by using the operation button group 27. For example, it is possible to carry out the confirmation of the video content easily by arranging a button or the like for reproducing the video whose picture was taken thereon.

Figure 11:
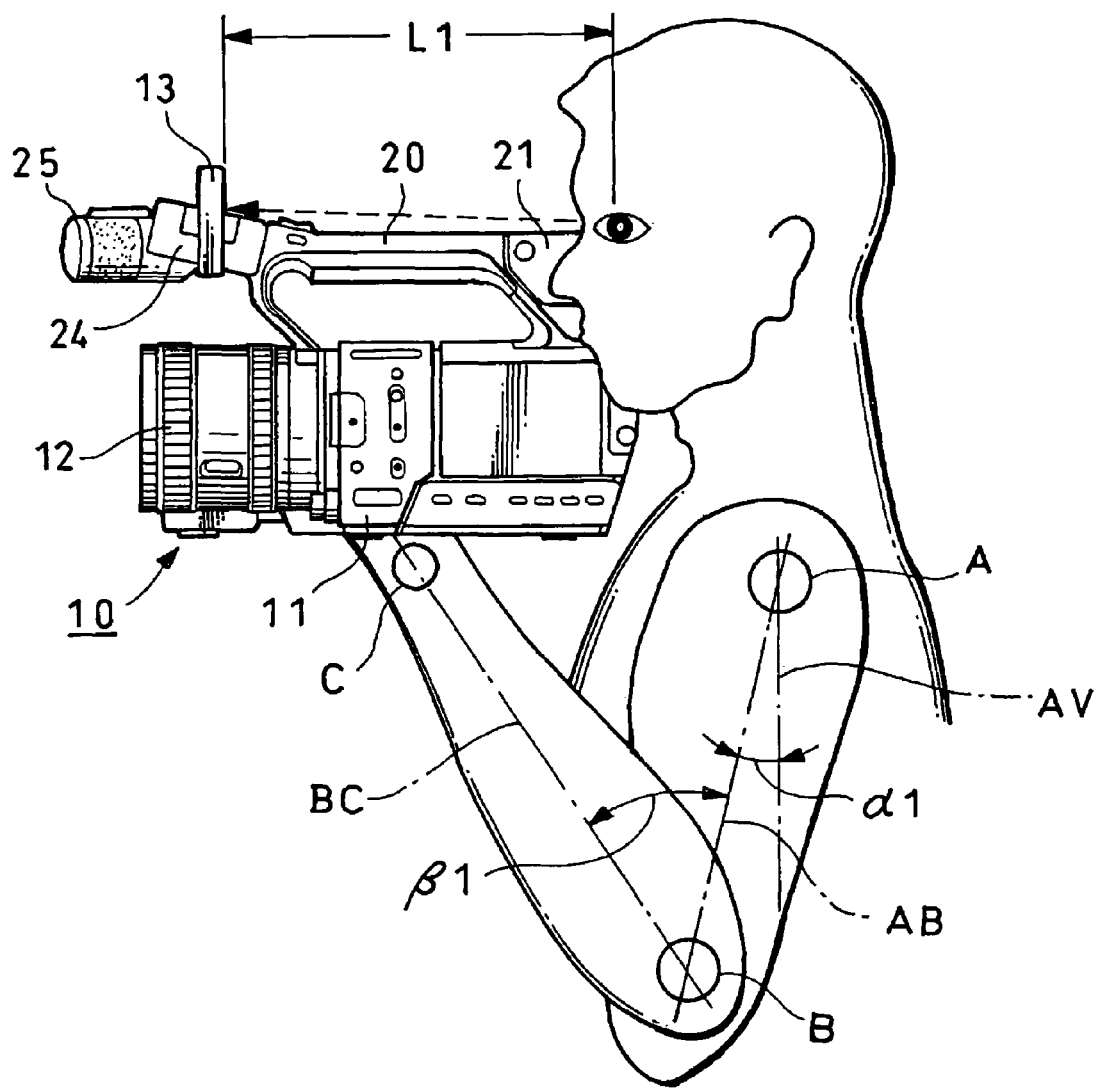
FIG. 11 shows a use state of the image pickup apparatus shown in FIG. 1 and is an explanatory diagram in which the display surface of the first display device is set to the height of eyes.

Further, by turning the planar monitor 13 to the front side approximately by 90 degree from the state shown in FIG. 2 centering around the second turning portion of the rotation supporting portion 30, it is possible to direct the display surface 13a to the subject. Also, by turning the planar monitor 13 rearward approximately by 90 degree, it is possible to direct the display surface 13a to the photographer as shown in FIG. 3. With respect to the video camera 10 in such as a state, as shown in FIG. 11, by setting the display surface 13a of the planar monitor 13 photographer on the eye line and supporting thereof, it is possible to take a picture while supporting the video camera 10 by a comfortable posture and while seeing the display surface 13a with eyes and confirming the subject.

Figure 20:
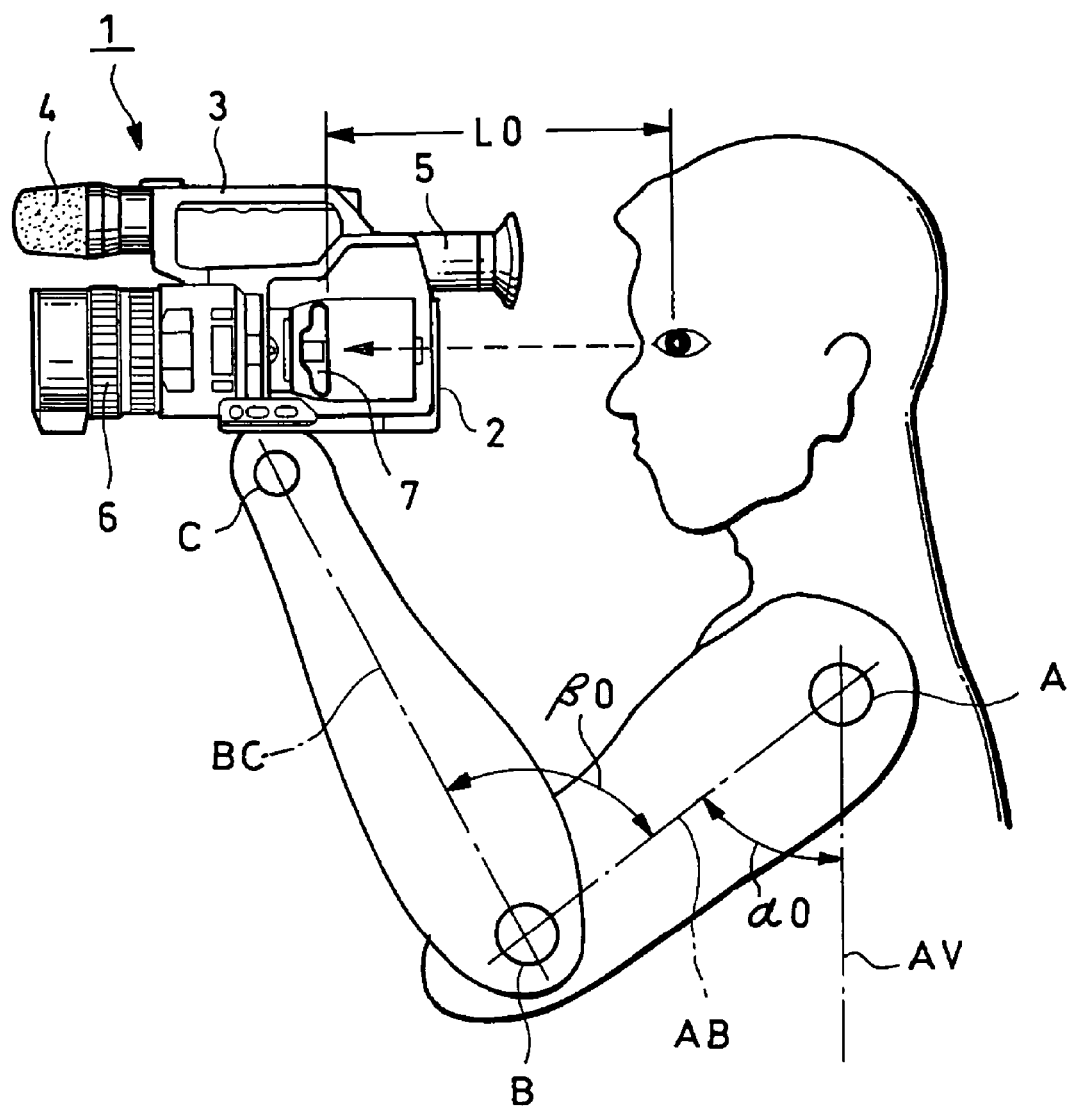
FIG. 20 shows a use state of an image pickup apparatus in the past and is an explanatory diagram in which the display surface of the display device is set to the height of eyes.

In this case, supposing that a distance L1 from the photographer's eye to the display surface 13a is approximately the same length as a distance L0 in the past shown in FIG. 20 (L1=L0), it is possible to make both the angles of angle $\alpha 1$ made by an upper arm line AB connecting a joint of shoulder A and a joint of elbow B of a photographer and a perpendicular line AV dropped perpendicularly from the joint of shoulder A and angle $\beta 1$ made by a lower arm line BC connecting the joint of elbow B and a joint of wrist C and the upper arm line AB small as compared with those in case of the example in the past.

In this state, it is possible to support the video camera 1 by bringing both the arms close to the side of the body, so that it is possible to support the video camera 1 by a relatively small force easily and furthermore certainly without adding a big power to the hand. Therefore, it is possible to reduce fatigue even in case of taking a picture for many hours and to carry out a preferable taking a picture with little shaking in which the display surface 13a becomes stable.

Also, after the display surface 13a is directed downward by turning the planar monitor 13 further rearward approximately by 90 degree from the state shown in FIG. 3 centering around the second turning portion of the rotation supporting portion 30, it is possible, by turning the planar monitor 13 to the right and left direction S approximately by 180 degree centering around the first turning portion and by storing the planar monitor 13 in the pedestal portion 24 as shown in FIG. 4, to direct the display surface 13a upward by overlapping the operation button group 27.

In this state, the planar monitor 13 is on the center line of the installed case body 11, so that it is possible to make the display surface 13a to be seen favorably. Furthermore, it never happens that both the edges of the planar monitor 13 project hugely to the side direction from the side face portion of the case body 11, so that the planar monitor 13 never becomes obstructive when taking a picture.

Figure 12:
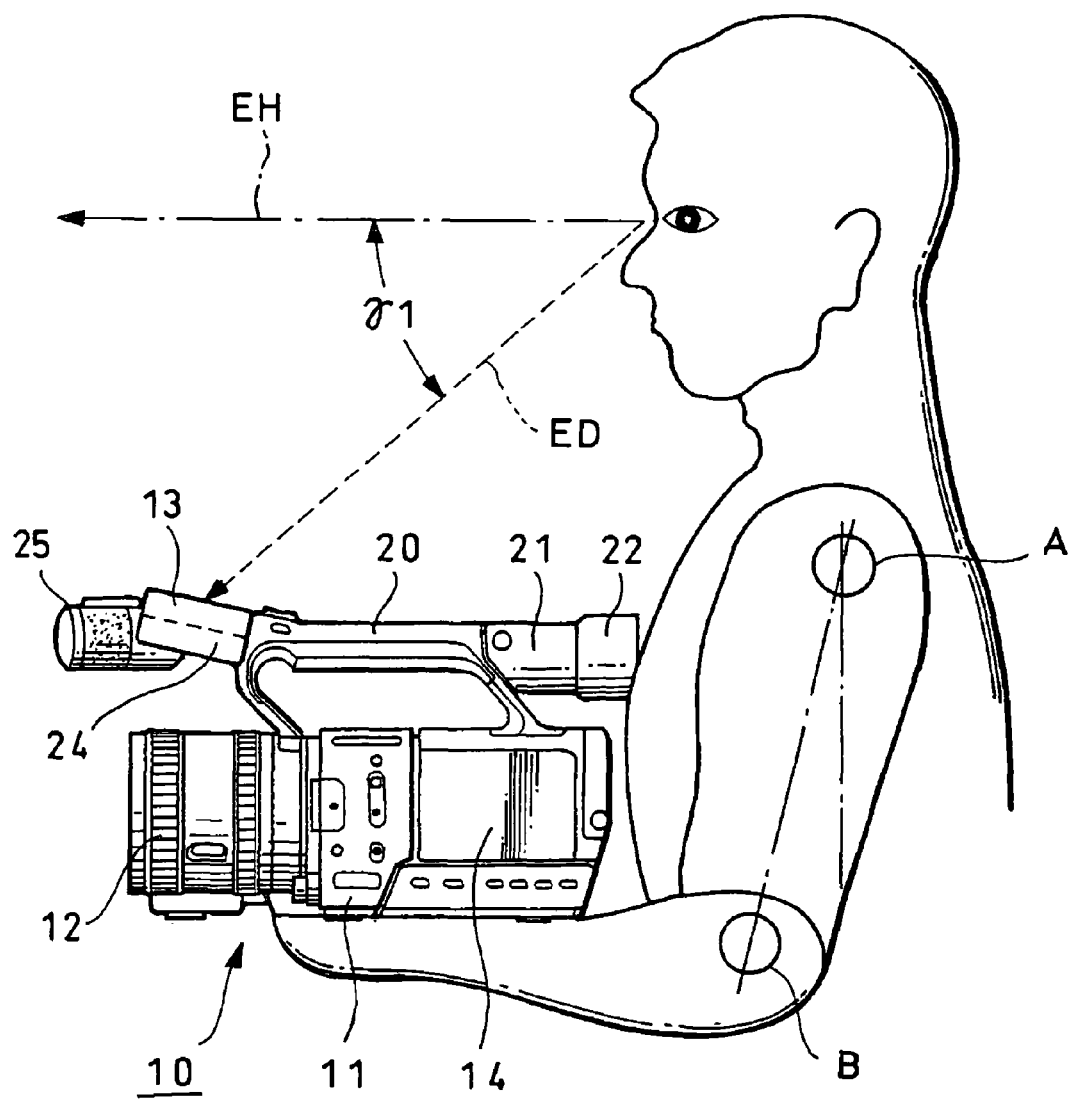
FIG. 12 shows a use state of the image pickup apparatus shown in FIG. 1 and is an explanatory diagram in which the display surface of the first display device is set to the height of breast.

Such a mounting posture of the planar monitor 13 is suitable, for example, as shown in FIG. 12, for a case when taking a picture is carried out by pressing the eye cup 22 at the tip of the electronic viewfinder 21 to the breast in order to make the video camera 10 not to shake and by fixing the video camera 10.

Figure 21:
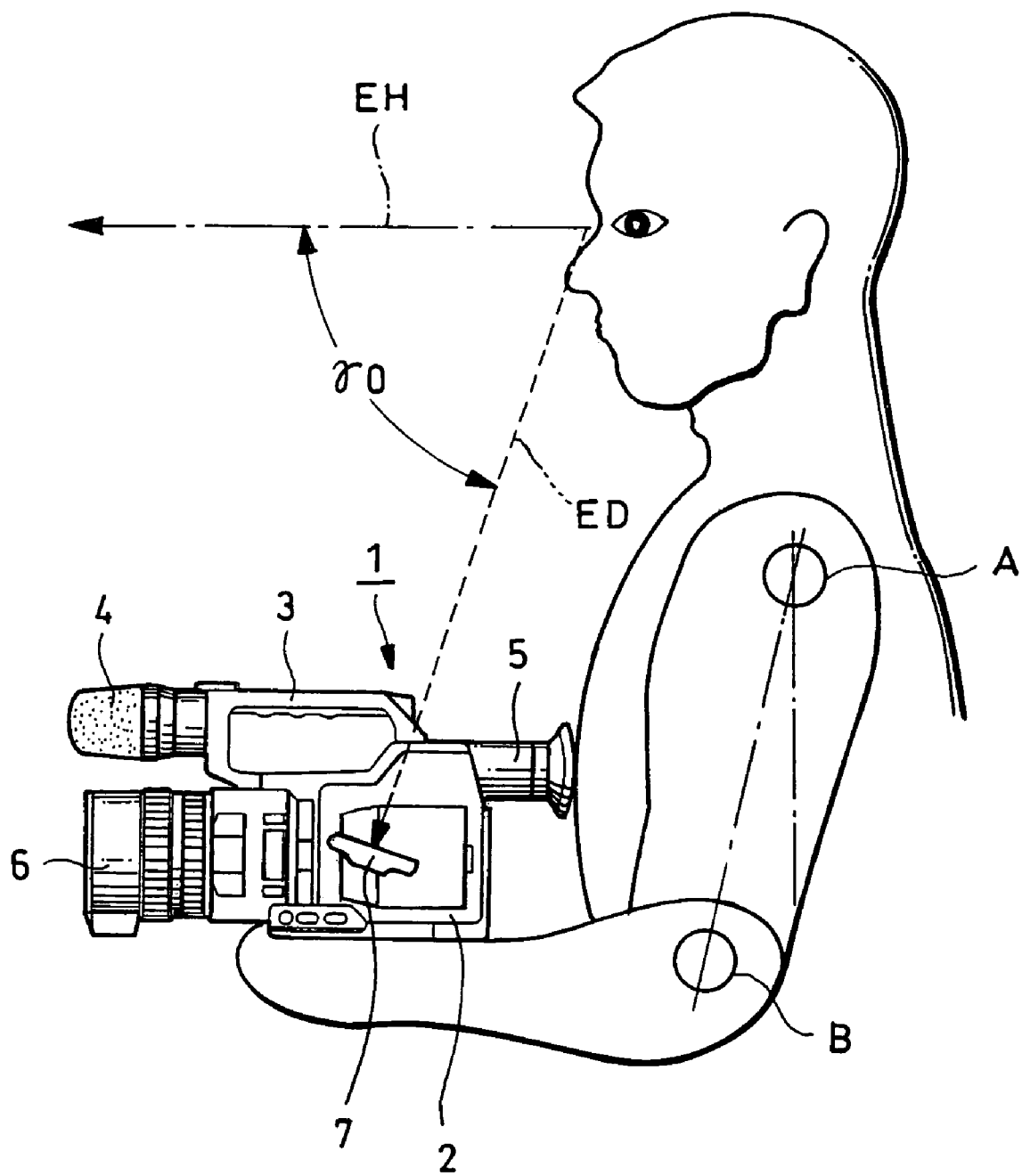
FIG. 21 shows a use state of an image pickup apparatus in the past and is an explanatory diagram in which the display surface of the display device is set to the height of breast.

When the photographer sees the display surface 13a of the liquid crystal display 13 in such a fixed state of the video camera 10, it is possible to make the angle $\gamma 1$ made by a horizontal eye line EH when his eye sees horizontal direction and an eye line ED directed to the display surface when his eye sees the display surface 13a to be small as compared with the case of the example in the past shown in FIG. 21 ($\gamma 1 > \gamma 0$). Therefore, it is possible to lower the angle in which the photographer swings his head in the up and down direction in order to see the subject and the display surface 13a alternately. Consequently, it is possible to reduce swing of the neck so as to reduce fatigue of the muscle of the neck and at the same time, it is possible reduce possibility of missing a picture recording chance.

Figure 13:
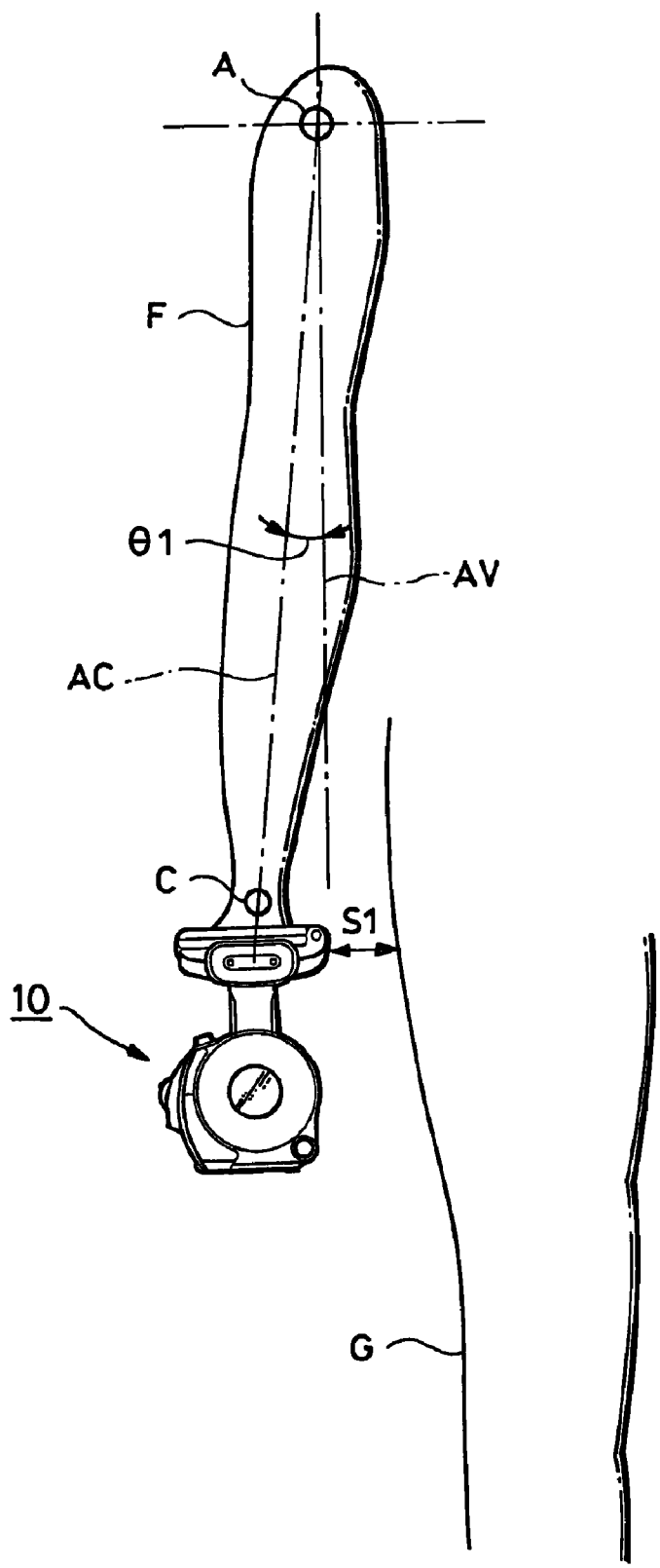
FIG. 13 shows a use state of the image pickup apparatus shown in FIG. 1 and is an explanatory diagram in which the image pickup apparatus is held by a low angle.
Figure 14:
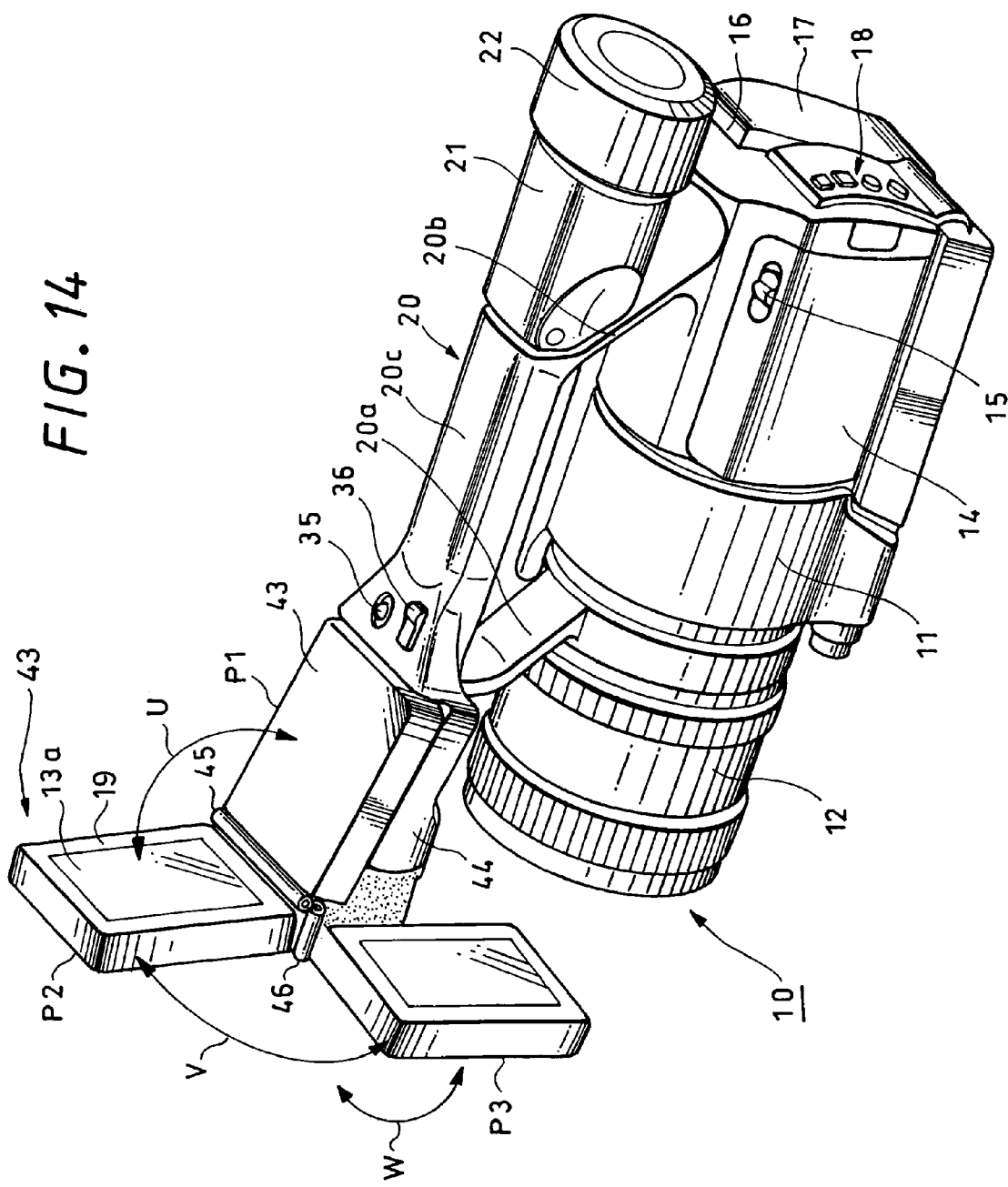
FIG. 14 shows an example of a second practical example of an image pickup apparatus according to the present invention and is an explanatory diagram explaining change of postures of the display device.

Further, the mounting posture of the planar monitor 13 shown in FIG. 4 is suitable for a case when, as shown in FIG. 13, taking a picture is carried out in a state in which the video camera 10 is lowered by holding the handle 20 with the hand F, a so-called taking a picture by low angle is carried. In this state, the display surface 13a of the planar monitor 13 is arranged just in front of the hand F holding the handle 20 and at the same time, the display surface 13a is a little bit inclined rearward, so that it is possible to lay the eye line on the display surface 13a by a comfortable posture. Therefore, it is possible to see the display surface 13a by a comfortable posture as compared with the case of the example in the past shown in FIG. 22.

Figure 22:
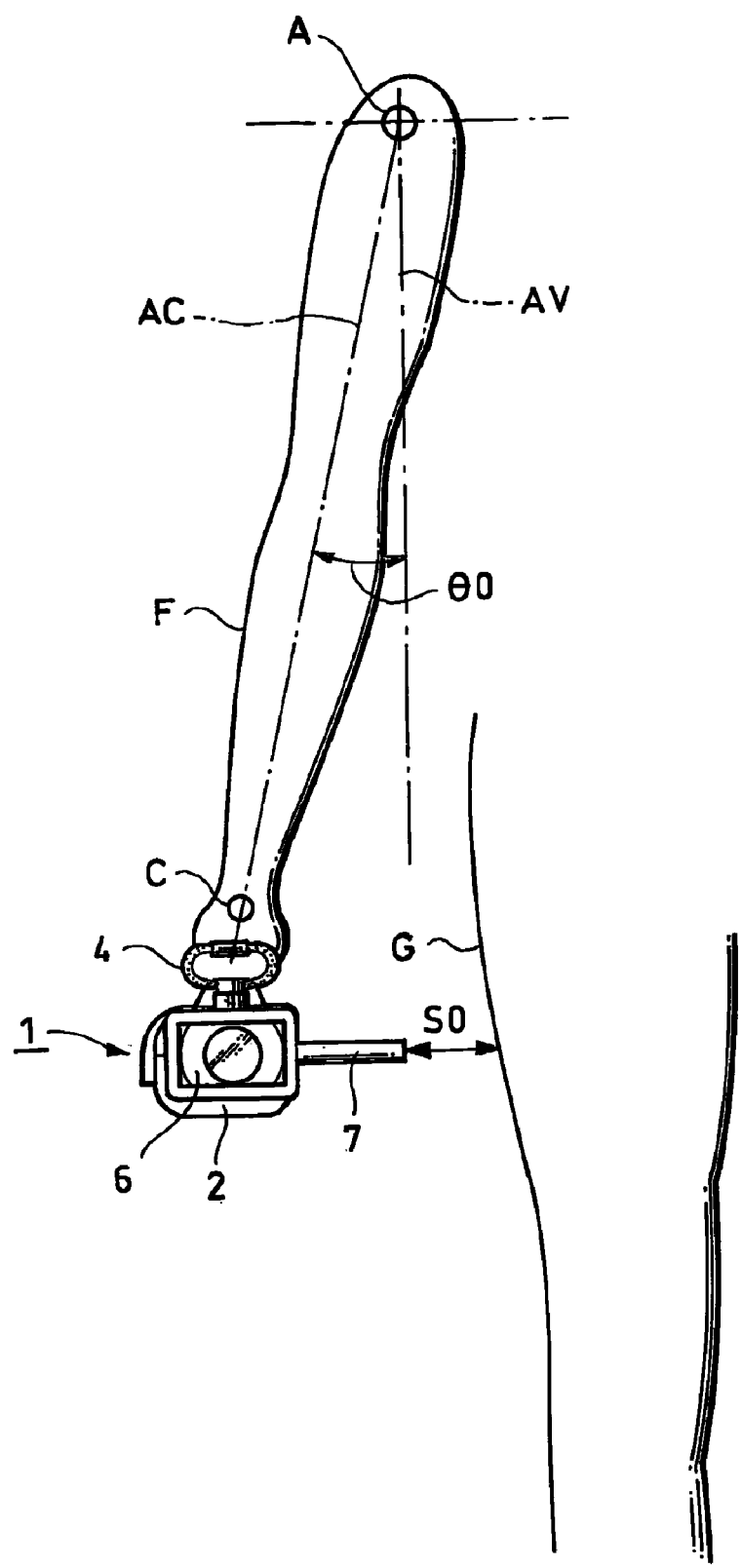
FIG. 22 shows a use state of an image pickup apparatus in the past and is an explanatory diagram in which the image pickup apparatus is held by a low angle.

Furthermore, in case of taking a picture by low angle, the planar monitor does not project hugely to the side direction from the side face portion such as a case of the example in the past shown in FIG. 22, so that it is possible to make angle $\theta 1$ made by the arm line AC connecting the joint of shoulder A and the joint of wrist C of the photographer and the perpendicular line AV dropped perpendicularly from the joint of shoulder A smaller than ever before ($\theta 1 < \theta 0$). Therefore, even if the video camera 10 is tried to be away from the leg G by a distance S1 (S1=S0) so as not to hit the leg G of the photographer, it is possible to lower the angle $\theta 1$ of the hand F at that time and consequently, it is possible to lower the power for making the hand F to be away from the leg G. In this manner, it is possible to lay and hold the video camera 10 relatively easily by relaxing a cramped posture in which weight can be felt easily.

Further, as shown in FIG. 9, the recording button 35 and the zoom button 36 are installed in the vicinity of the pedestal portion 24 for the grasping portion 20c of the handle 20, so that it is possible to carry out operations by the recording button 35 and the zoom button 36 according to the thumb operation while the posture itself is maintained without changing the posture holding the grasping portion 20c. Consequently, possibility of missing a picture recording chance can be lowered and at the same time, it is possible to carry out the zooming operation rapidly.

FIG. 14 shows a second practical example of a mounting method of the planar monitor. A planar monitor 43 shown in this practical example is constituted such that it is possible according to two rotational axes 45 and 46 provided at the edge portion of the handle 20 to take three positions P1, P2 and P3 when classify broadly.

The constitution of the planar monitor 43 is similar to that of the planar monitor 13 mentioned above, but an aspect in which the first rotational axis 45 and the second rotational axis 46 for coupling with the pedestal portion 44 rotatably are provided at the tip portion of the handle 20 is different therefrom. While the first rotational axis 45 is extended to the right and left direction, the second rotational axis 46 is extended to the front and rear direction. Other constitutions are similar to those of aforesaid practical example, so that the explanation thereof will be omitted.

The position P1 of the planar monitor 43 shown in FIG. 14 shows a state in which the planar monitor 43 is stored in the pedestal portion 44 by overlapping therewith. The planar monitor 43 becomes in a state of the position P2 from this state by turning the planar monitor 43 upward approximately by 90 degree (to direction shown by arrow U) turning-centering around the first rotational axis 45. Next, the planar monitor 43 becomes in a state of the position P3 the state of the position P2 by turning the planar monitor 43 to the right and left direction approximately by 180 degree (to direction shown by arrow V) turning-centering around the second rotational axis 46.

Also, it is possible, by turning the planar monitor 43 upward (to direction shown by arrow W) approximately by 180 degree turning-centering around the first rotational axis 45 in the state of the position P3, to make the display surface 13a of the planar monitor 43 to be faced to the subject. Similar effects as those of aforesaid practical example can be obtained according to the video camera 10 having such a constitution.

Figure 15:
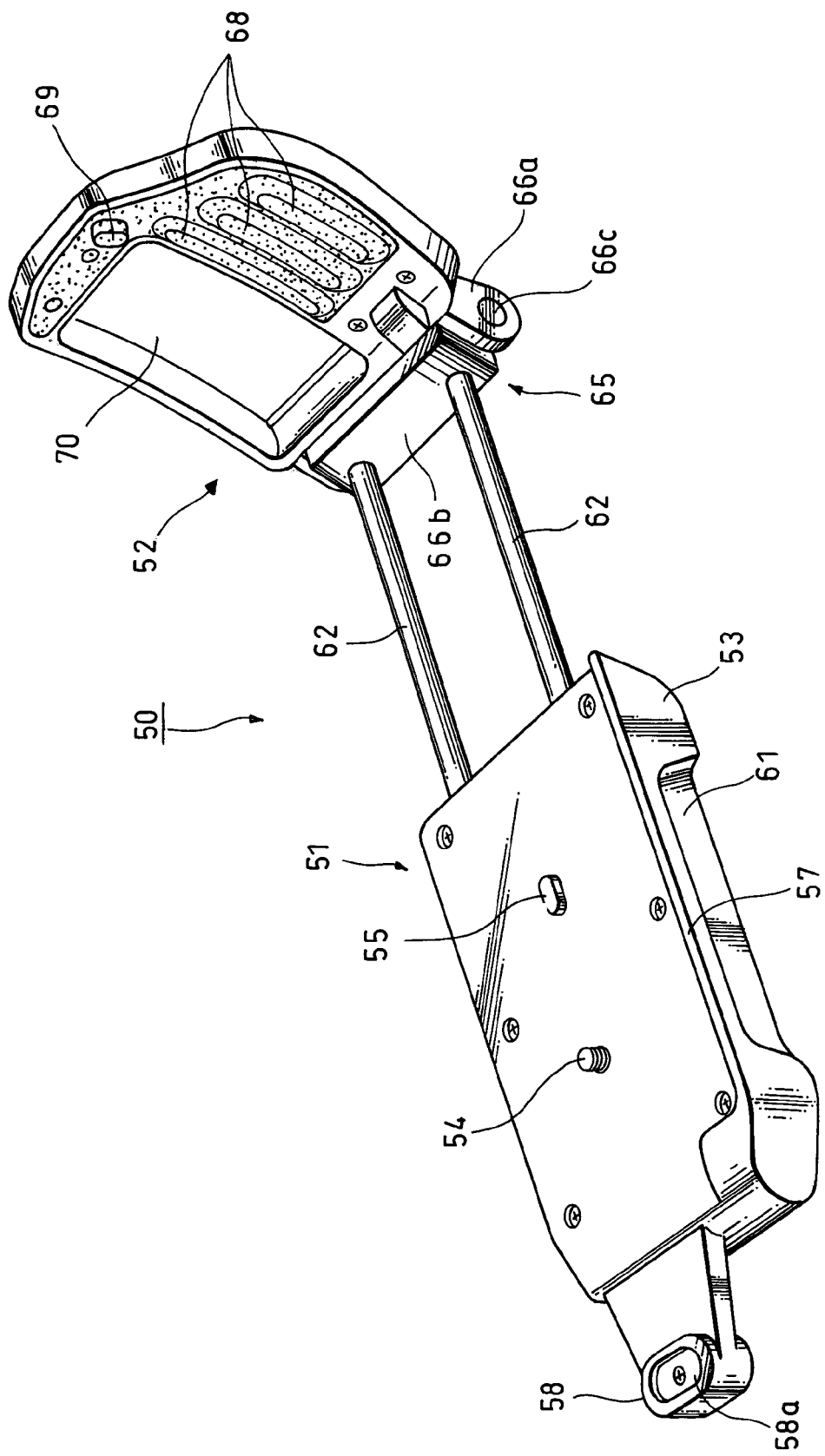
FIG. 15 shows one practical example of a shoulder attachment suitably used in an image pickup apparatus of the present invention and is a perspective view seen from the obverse side thereof.
Figure 16:
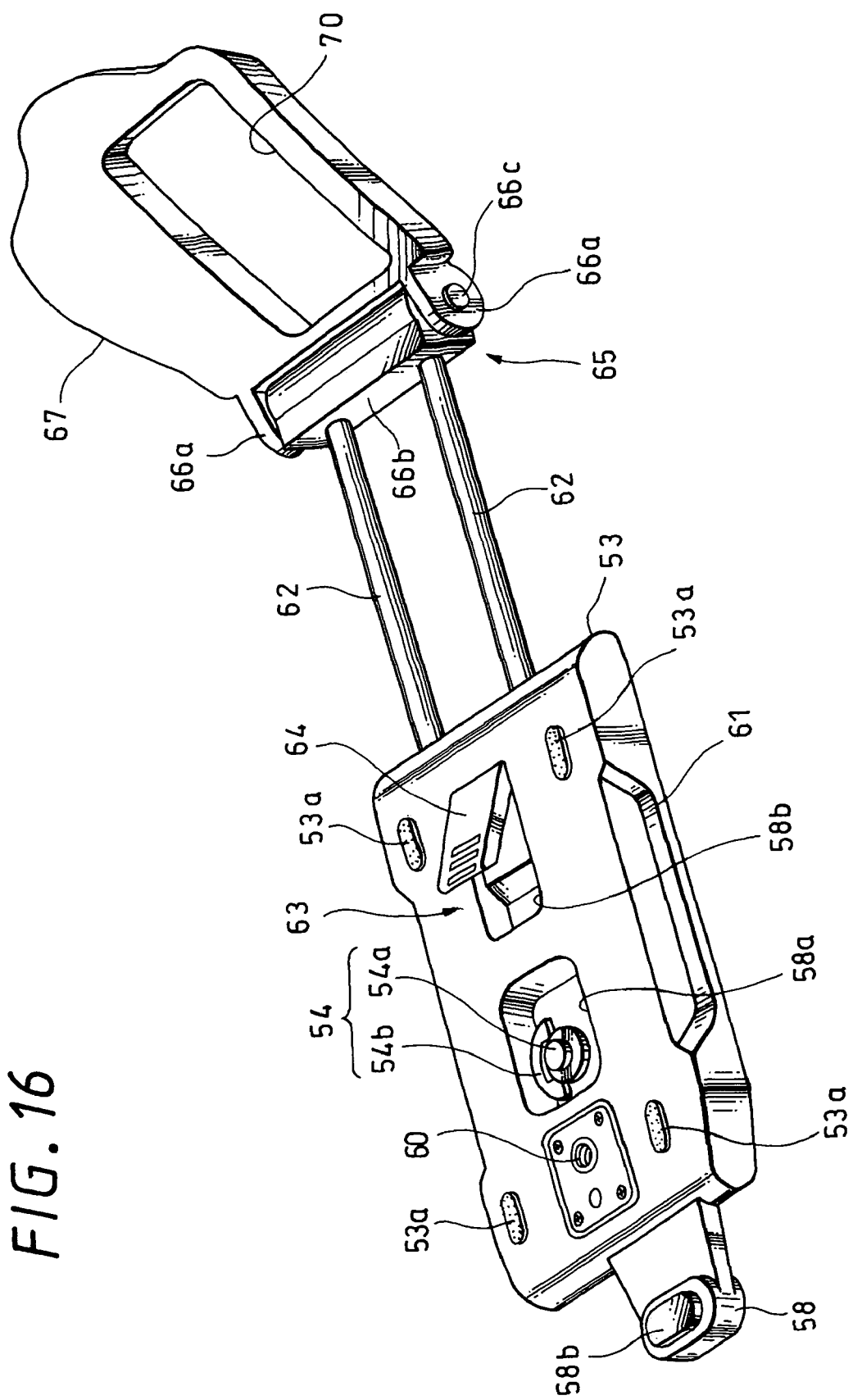
FIG. 16 shows one practical example of a shoulder attachment suitably used in an image pickup apparatus of the present invention and is a perspective view seen from the backside thereof.
Figure 17:
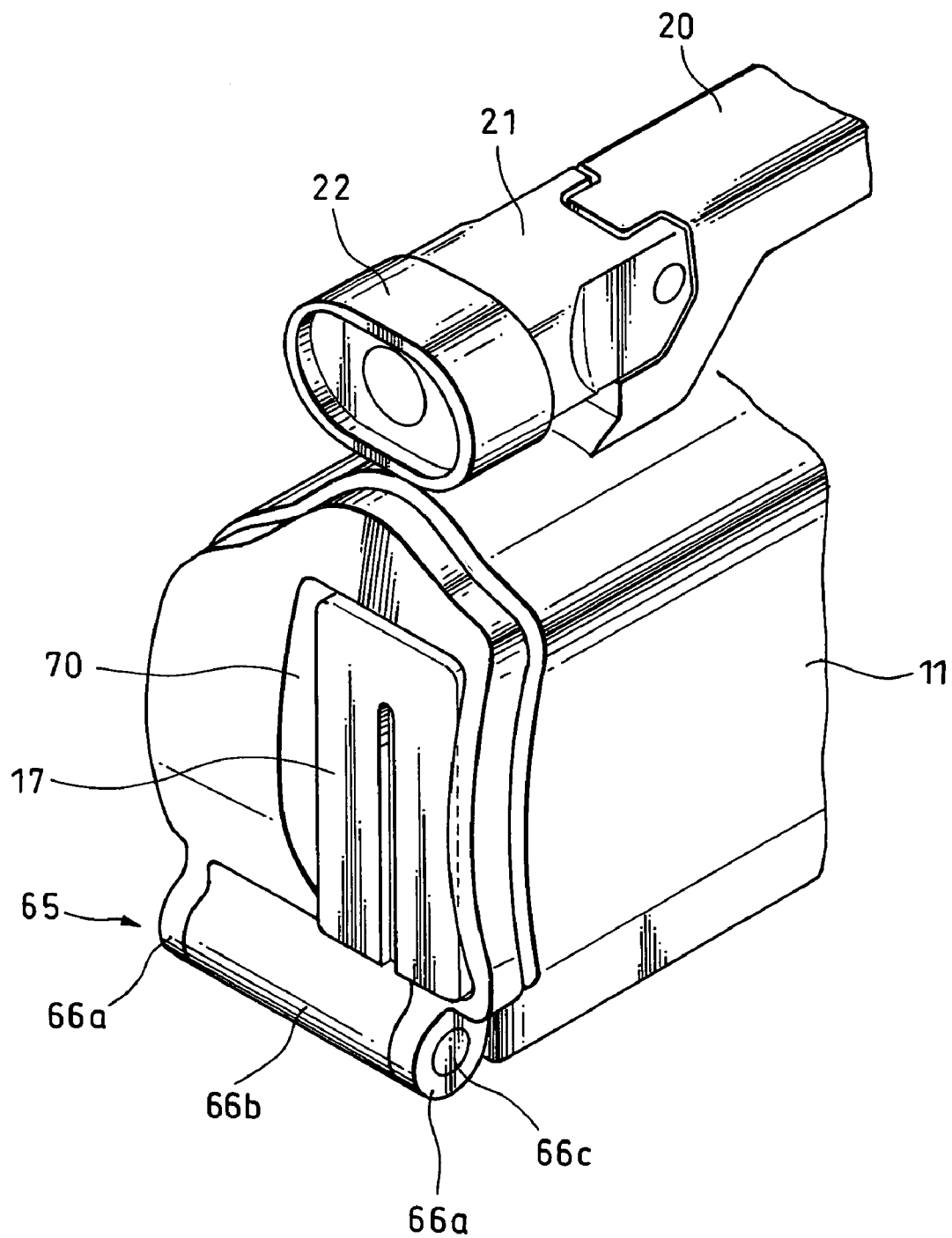
Figure 18:
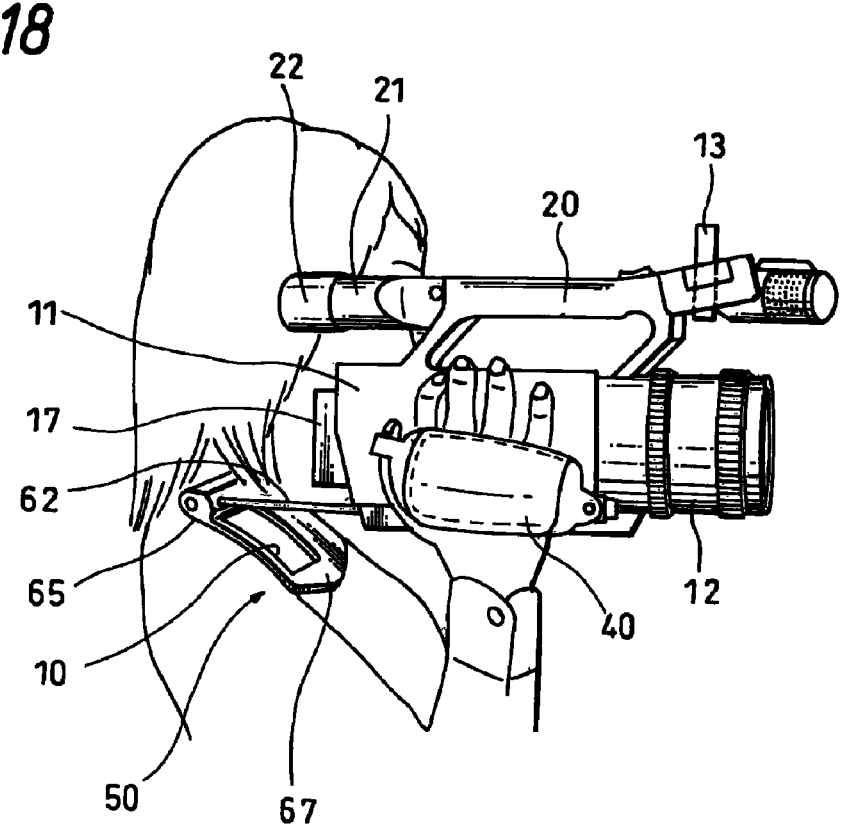
FIG. 18 shows a use example of a shoulder attachment suitably used in an image pickup apparatus of the present invention and is an explanatory diagram a state in which a supporting piece is attaching to shoulder.
Figure 19:
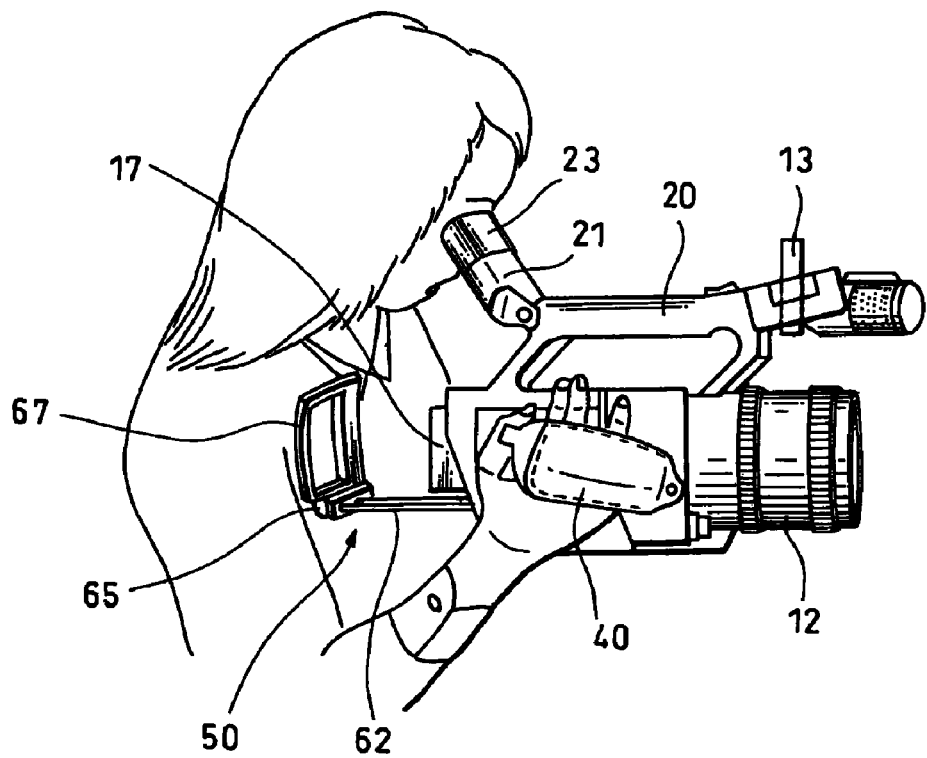
FIG. 19 shows a use example of a shoulder attachment suitably used in an image pickup apparatus of the present invention and is an explanatory diagram a state in which a supporting piece is attaching to breast.

The video camera 10 having a constitution such as mentioned above can take a picture by being fixed firmly on a user's body by using a shoulder attachment (referred to also as "shoulder brace") such as shown in the drawing of FIG. 15 or the like and it is possible to prevent or to effectively repress picture disturbance caused by camera shake or the like. FIG. 15 to FIG. 17 show one practical example of a shoulder attachment relating to the present invention, and FIG. 18 and FIG. 19 are explanatory diagrams for explaining use states of that shoulder attachment.

As shown in FIG. 15 and FIG. 16, a shoulder attachment 50 shown according to the present practical example is to be used by being mounted detachably on the case body 11. The shoulder attachment 50 is constituted by a shoulder attachment body 51 fixed detachably on the case body 11 and a shoulder attaching portion 52 supported such that it can be approaching and/or departing (approaching/departing) with respect to the shoulder attachment body 51.

The shoulder attachment body 51 is provided with a casing 53 consisting of a flat housing forming approximately a quadrangle which has approximately the same size as the bottom face of the video camera 10. There are provided, approximately at the center portion of the upper face of the casing 53, a main body mounting screw 54 for fixing the shoulder attachment body 51 to the case body 11 and a positioning projection 55 for positioning the case body 11.

The main body mounting screw 54 and the positioning projection 55 are arranged by being apart by a predetermined distance in the longitudinal direction and a screw portion provided on one side of the screw axis 54a of the main body mounting screw 54 is projected upward. The other side of a screw axis 54a of the main body mounting screw 54 passes through the casing 53 and a turning piece 54b mounted on the head portion thereof is contained in a concave portion 56a provided at the bottom face of the casing 53.

Further, there is provided on the upper face of the casing 53 an elongated projection edge 57 for positioning which plays a role of positioning the case body 11 cooperatively with the positioning projection 55 with respect to the shoulder attachment body 51. This elongated projection edge 57 is formed over the entire length in the longitudinal direction on one side of the casing 53 in its width direction. One of the side edges of the case body 11 in the longitudinal direction is attached to the inside of the elongated projection edge 57.

At that time, the positioning projection 55 is engaged with a positioning hole which, though not shown, is provided on the bottom face of the case body 11 and the video camera 10 is positioned at a predetermined position with respect to the shoulder attachment body 51 owing to respective engagements among these of the positioning projection 55, the positioning hole, elongated projection edge 57 and the case body 11. Then, the shoulder attachment 50 is fixed to the video camera 10 integrally by screwing and screwing up the screw portion of the screw axis 54a of the main body mounting screw 54 to a mounting hole for a tripod of the case body 11.

There is provided, on one side of the casing 53 in the longitudinal direction, a front leg portion 58 for supporting the lens device 12 of the video camera 10 from below. There is provided, on the upper face of the front leg portion 58, a concave portion 58a to which a support portion 12a provided at the bottom portion of the lens device 12 (see FIG. 5) is to be fit. Also, there is provided, on the under surface of the front leg portion 58, a leg convex portion 58b for carrying out a support by the same height as the leg portion 53a of the casing 53 on a flat supporting face. The leg portion 53a of the casing 53 is provided on the four corners of the under surface thereof and these four of the leg portion 53a and the leg convex portion 58b of the front leg portion 58 are set to have the same height respectively.

Also, there is provided, between the front leg portion 58 and the main body mounting screw 54 on the under surface of the casing 53, a mounting hole 60 for a tripod for mounting a tripod detachably. It is possible, by using this mounting hole 60 for a tripod, to mount a tripod which is used usually. Further, there is provided, on both the sides in the width direction of the under surface of the casing 53, concave portions 61 and 61 for grasping which are extended in the longitudinal direction. It is possible, by holding the concave portions 61 and 61 for grasping from both the sides thereof like putting fingers thereon, to grasp the casing 53 firmly and it is possible to prevent occurrence of a trouble such as failure in holding the shoulder attachment 50 or the like.

The casing 53 is inserted there-through with two of supporting arms 62 and 62 in the longitudinal direction thereof. The two of the supporting arms 62 and 62 are arranged in parallel by being apart from each other with a predetermined distance in the width direction of the casing 53 and it is constituted such that they are movable back and forth to the axis direction. It is constituted such that each one terminal of the two of the supporting arms 62 and 62 is prevented from getting out therefrom in the casing 53 and at the same time, they are freely fixed at an arbitrary position by a locking mechanism 63.

The locking mechanism 63 includes, as shown in FIG. 16, an operation piece 64 projecting downward the casing 53. The operation piece 64 of the locking mechanism 63 is made to be taken in and out freely with respect to a concave portion 56*b* provided on the under surface of the casing 53, and the lock is released in a state in which it projects from the concave portion 56*b* shown in FIG. 16 and is locked in a state in which it is inserted to the concave portion 56*b* such that the back and forth operation of the two of supporting arms 62 and 62 is to be fixed.

A supporting piece 66 is mounted freely rotatably at the tip of the two of the supporting arms 62 and 62 through a hinge 65. As shown in FIG. 17, the supporting piece 66 has approximately the same size as the back face of the case body 11 and it is constituted such that it covers the back face of the case body 11 when it is approached to the case body 11 after the two of the supporting arms 62 and 62 are shortened. Then, there are provided, on the inner face of the supporting piece 66, a plurality of stripe shaped elongated projections 68 and 68 for preventing the inner face thereof from contacting with the operation button or the operation switch provided on the case body 11 and a projection 69.

Further, the supporting piece 66 is provided with a through-hole 70 for avoiding a contact with the battery 17 mounted on the case body 11 when approaching to the case body 11 by shortening the two of the supporting arms 62 and 62.

One terminal of the supporting piece 66 is provided with a pair of bearing pieces 66*a* and 66*a* forming a portion of the hinge 65. A coupling portion 66*b* of the hinge 65 intervenes between the pair of bearing pieces 66*a* and 66*a* and a support axis 66*c* passes there-through. The hinge 65 is constituted such that it can be fixed at an arbitrary position by a frictional force according to a friction means which is not shown. However, it may be constituted, for example, such that it can be fixed at an arbitrary position or a predetermined position by proving a fixing screw or the like.

This supporting piece 66 is used for making it to be integral by being attached to a user's shoulder or being attached to his arm, wherein shake of the picture screen is eliminated and an easily viewable picture screen is to be obtained. Therefore, the length of the supporting arm 62 is made to be freely adjustable and it is constituted such that adjustment thereof to long and short direction is freely possible depending on a user's body type.

FIG. 18 and FIG. 19 explain use states of the video camera 10 mounted with the shoulder attachment 50 having above mentioned constitution. FIG. 18 shows a state in which the video camera 10 is held for taking a picture by attaching the supporting piece 67 of the shoulder attachment 50 onto the shoulder. At that time, the eye of the photographer can see the picture screen of the planar monitor 13 which is the first display device. In this case, the video camera 10 is fixed firmly on the shoulder through the shoulder attachment 50. Therefore, it is possible to hold the video camera 10 firmly for relatively many hours and it is possible to execute a beautiful taking a picture without a shake over many hours by supporting the weight of the camera.

FIG. 19 shows a state in which the video camera 10 is held for taking a picture by attaching the supporting piece 67 of the shoulder attachment 50 onto the breast. At that time, the eye of the photographer can see the picture screen of the viewfinder 21 which is second display device. Also in this case, the video camera 10 is fixed firmly on the breast through the shoulder attachment 50. Therefore, it is possible to hold the video camera 10 firmly for relatively many hours and it is possible to carry out a beautiful taking a picture without a shake over many hours by supporting the weight of the camera.

As explained above, according to the present invention, it is constituted such that a planar monitor 13 is arranged at the front portion of the handle 20 which is installed on the upper portion of the case body 11, so that it is possible for a photographer to support the video camera 10 without making it apart from the body and furthermore by avoiding an operation lifting it upward as much as possible and it is possible to makes it very easy to be held. Furthermore, even in a case when taking a picture is carried out while grasping the handle 20 on an occasion of a low angle imaging, it never happens that the planar monitor 13 becomes obstructive, so that it never happens that a cramped posture for taking a picture is forced and it is possible to carry out an activity of taking a picture by a comfortable operation.

Further, the planar monitor 13 is arranged in the vicinity of the handle 20, so that it is possible to carry out the operation of the operation button while seeing the display surface 13*a* without moving the eye line hugely and it is possible to improve operationality drastically in the image pickup apparatus of this kind. Further, it is possible, by arranging the relatively large first display device on the handle 20, to get allowance in the inside construction of the case body 11 and it is possible to attempt upgrade functionally and at the same time, it is possible to heighten flexibility on the side of design matter.

It was explained in aforesaid practical example with respect to the example in which the planar monitor 13 is constituted such that its posture can be changed with respect to the handle 20, but it is needless to say that it may be constituted such that the planar monitor 1 of a liquid crystal display or the like is provided integrally with the handle. For example, the operation button group 27 is eliminated in FIG. 4 and also, the rotation supporting portion 30 is abolished so as to provide the planar monitor 1 by burying it in the handle. In this case, it is needless to say that it may be constituted such that the operation button group is to be arranged in the vicinity of the planar monitor 1.

Also, according to the video camera 10 of the present practical example, it is not necessary, owing to the fact that the electronic viewfinder 21 is arranged at a place apart from the main body of the video camera 10, to install a construction of the mounting portion of the electronic viewfinder 21 on the main body of the video camera 10 and it is possible to make the main body of the video camera 10 to be small and also, when the electronic viewfinder 21 is repaired or the like, mounting and detaching thereof is easy. Also, the electronic viewfinder 21 is mounted on the handle 20 which is formed basically strongly for being carried apart from the main body of the video camera 10 including complicated electronic circuits or built-in structures and also whose built-in structure is not complicated relatively, so that it is very effective for the simplification or the mounting strength of the construction of the mounting portion.

A Further, according to the video camera 10 of the present practical example, the electronic viewfinder 21 is moved upward apart from the main body of the video camera 10, so that the height of lifting the video camera 10 when taking a picture is limited to be low, it becomes possible to take a picture by folding the arm and by tightening the side and it is possible to take a picture for many hours by a stable posture. Also, the electronic viewfinder 21 is arranged by approximately the same height as the planar monitor arranged on the front side of the handle 20, so that it becomes unnecessary to change the height for lifting the video camera 10 even when taking a picture normally while either of the pictured is confirmed and it is possible, when a photographer makes a composition, to reduce his uncomfortable feeling.

Also, according to the video camera 10 of the present practical example, the electronic viewfinder 21 is arranged approximately on the same axis as the handle 20, so that it is possible to house the construction of the mounting portion of the electronic viewfinder 21 in the inside of the handle 20 and it is possible to make the visually size for the built-in structure to be inconspicuous. Further, it is not necessary to turning-operate the electronic viewfinder 21 when attaching and detaching the battery 17 and it is possible to make the attaching and detaching operation to be easy-to-use and it is possible to house the outer shape of the battery 17 within the outer shape of the main body of the video camera 10, so that it is possible to make it to be nice-looking on the side of design matter.

Further, it is not necessary to cut open the case body of the upper portion of the battery 17 for the electronic viewfinder 21, so that it is possible, when a concave shape as the battery housing portion 16 is formed on the back face of the case body 11, to form the wall of the back face of the case body 11 by a continuous shape and it becomes advantageous with respect to an aspect for assuring strength of the case body 11 around the battery housing portion 16.

In this manner, according to the image pickup apparatus of aforesaid practical example, it is possible to arrange the electronic viewfinder 21 which is projected rearward in the light axis direction approximately on the same axis as the axis center of the handle 20 freely rotatably by keeping an adequate strength and also, the exchange of the battery 17 can be carried out without turning the electronic viewfinder 21 and by maintaining the state when taking a picture.

For example, it never happens that the function is damaged even if it is manhandled in a greater or less degree such as in a case of a job site of taking a picture of news or the like and also, it is possible to make it to be a suitable constitution as a video camera for business use in which it is necessary to return to a state of taking a picture in a short period of time by carrying out a battery exchange rapidly and certainly and to take a picture for many hours in a stable posture. Furthermore, the turning mechanism of the electronic viewfinder 21 can be installed without being conspicuous, the battery 17 can be housed so as not to project from the outer shape, and it can be smart-looking from the viewpoint of design.

Further, by using after mounting the shoulder attachment 50 on the video camera 10 in aforesaid practical example, it is possible to take a picture by fixing the video camera 10 firmly similarly as in a case of a business use though it has a significantly simple constitution and it is possible to carry out beautiful picture making without shake. Also, it was explained in aforesaid practical example with respect to an example in which taking a picture is carried out by using either one of the flat panel 13 and the electronic viewfinder 21, but it is needless to say that taking a picture may be carried out by using both the sides of the flat panel 13 and the electronic viewfinder 21 concurrently.

It should be noted that if the electronic viewfinder 21 explained in the aforesaid practical example has a constitution in which the handle 20 is arranged on the upper portion of the video camera 10 and the electronic viewfinder 21 can be mounted such that a space for a manual operation of the battery exchange can be assured at the rear portion of the handle 20 and away upward from the battery housing portion 16, it is possible to apply also to a video camera having other configuration of the planar monitor or the like, for example, such as the image pickup apparatus 100 in the past or the like, wherein it can be understood easily that an operational effect similar to that of the above mentioned practical example can be obtained.

Also, it was explained in aforesaid practical example with respect to an example in which a CCD is used as an imaging means, but the present invention is not limited by this and, for example, it may be an example in which a solid-state imager device such as a CMOS (Complementary Metal Oxide Semiconductor) or the like is used. Further, EL (Electro Luminescence Electroluminescence), a flat Braun tube or the like may be used instead of a liquid crystal display as a display device of a large picture screen if it is a monitor.

INDUSTRIAL APPLICABILITY

The present invention is not limited by the exemplified embodiments above mentioned and also shown in the drawings and various modified embodiments will be possible within the region without departing from the scope. For example, the direction to which the axis center line of the rotational axis is extended was constituted in the aforesaid practical example such that it was extended to the front and rear direction and the right and left direction perpendicular thereto, but it may be constituted such that the direction to which the axis center line of the rotational axis is extended is to be set to the direction inclined by a proper angle with respect to the front and rear direction. Also, with respect to the operation buttons provided on the handle, they are not limited by those cited in aforesaid practical examples.

Further, it was explained in aforesaid practical examples with respect to examples applied to an electronic still camera (digital camera) as an image pickup apparatus, but it is needless to say that it is applicable to other types of image pickup apparatuses such as, for example, a video camera, a personal computer with a camera, a PDA (portable information communication equipment) and the like.

The invention claimed is:

1. An image pickup apparatus comprising:
imaging means for forming a video signal of a subject according to a light inputted from a lens device;
an image pickup apparatus body which houses said imaging means and includes a handle, the handle having a long axis and a short axis, the long axis extending in a direction approximately parallel with a light axis direction of a lens system of said lens device and the handle being provided on an upper portion of the image pickup apparatus body; and
a first display device to display a video picture according to said video signal, said first display device provided on a front portion, in said light axis direction, of said handle such that a posture of the first display device can be changed, wherein
said first display device is coupled to said handle freely rotatably by a rotational axis being extended in a parallel direction, an orthogonal direction or a direction inclined by an appropriate angle with respect to said light axis direction;
said first display device performs a turning operation and a reversing operation to an axis center line direction and to an orthogonal direction of said rotational axis; and
a display surface of the first display device or a non-display surface on an opposite side of said display surface is arranged on said handle selectively.

2. An image pickup apparatus according to claim 1, wherein said first display device includes a flat planar monitor and a turning support mechanism to support said planar monitor on said image pickup apparatus body freely rotatably and said planar monitor is turnable by up to approximately 180 degrees by a turn of said turning support mechanism.

3. An image pickup apparatus according to claim 2, wherein said planar monitor performs a reversing operation by the turn of said turning support mechanism, either of a display surface of the planar monitor and a non-display surface of an opposite side of the planar monitor is selectively arranged in a housing position of said planar monitor, said planar monitor includes a flat housing, a first main face of said flat housing is provided with the display surface of said planar monitor, and a second main face which is on the opposite side of said first main face is the non-display surface.

4. An image pickup apparatus according to claim 1, wherein a display surface of said first display device is provided such that a front portion of the display surface, in said light axis direction, is heightened and declines rearward, in said light axis direction.

5. An image pickup apparatus according to claim 1, wherein an operation button to operate said imaging means is arranged at a position of said handle covered by said first display device.

6. An image pickup apparatus according to claim 1, wherein an operation button to operate said imaging means is arranged in a vicinity of a position on which said first display device of said handle is arranged and rearward of the first display device in said light axis direction.

7. An image pickup apparatus according to claim 1, wherein a second display device is provided rearward said handle of said image pickup apparatus body in said light axis direction and approximately on a same axis as said handle and said second display device includes a viewfinder.

8. An image pickup apparatus according to claim 7, wherein said viewfinder is arranged freely rotatably to an upper direction by a rotational axis provided on said handle.

9. An image pickup apparatus according to claim 7, wherein a light axis of said viewfinder and a light axis of said lens system of said image pickup apparatus body are arranged by a predetermined distance and said viewfinder is arranged in an upper portion apart from said image pickup apparatus body.

10. An image pickup apparatus according to claim 9, wherein a concave space is provided between an upper portion of a battery housing portion provided on a back face of said image pickup apparatus body and said image pickup apparatus body and the battery is detachable from the image pickup apparatus body by being unlocked.

11. An image pickup apparatus according to claim 1, further comprising:
a shoulder attachment mounted on said image pickup apparatus body detachably, said shoulder attachment including a shoulder attaching portion supported such that it can be approaching/departing with respect to a back face of said image pickup apparatus body.

12. An image pickup apparatus comprising:
imaging means for forming a video signal of a subject according to a light inputted from a lens device;
an image pickup apparatus body which houses said imaging means and includes a handle, the handle having a long axis and a short axis, the long axis extending in a direction approximately parallel with a light axis direction of a lens system of said lens device and the handle being provided on an upper portion of the image pickup apparatus body;
a first display device to display a video picture according to said video signal, said first display device provided on a front portion, in said light axis direction, of said handle such that a posture of the first display device can be changed; and
a shoulder attachment mounted on said image pickup apparatus body detachably, said shoulder attachment including a shoulder attaching portion supported such that it can be approaching/departing with respect to a back face of said image pickup apparatus body.

13. An image pickup apparatus according to claim 12, wherein said shoulder attaching portion includes a supporting arm supported elastically with respect to the back face of said image pickup apparatus body and a supporting piece supported freely rotatable at a tip of said supporting arm.

14. An image pickup apparatus according to claim 13, wherein said supporting piece has approximately a same size with the back face of said image pickup apparatus body and is constituted to cover the back face of said image pickup apparatus body when said supporting arm is approached to the image pickup apparatus body by being shortened.

15. An image pickup apparatus according to claim 13, wherein said supporting piece is provided with a through-hole for avoiding a contact with the battery mounted on the back face of said image pickup apparatus body.

16. An image pickup apparatus according to claim 12, wherein said shoulder attachment includes a shoulder attachment body fixed on said image pickup apparatus body detachably and said shoulder attachment body is provided with a positioning portion for positioning a bottom portion of the image pickup apparatus body and a supporting arm housing portion which houses said supporting arm such that said supporting arm can be taken in and out with respect to the supporting arm housing.

17. An image pickup apparatus comprising:
imaging means for forming a video signal of a subject according to a light inputted from a lens device;
an image pickup apparatus body which houses said imaging means and includes a handle, the handle having a long axis and a short axis, the long axis extending in a direction approximately parallel with a light axis direction of a lens system of said lens device and the handle being provided on an upper portion of the image pickup apparatus body; and
a first display device and a second display device to display a video picture according to said video signal, said first display device provided on a front portion, in said light axis direction, of said handle such that a posture of the first display device can be changed, and said second display device provided on a rear portion, in said light axis direction, of said handle such that a posture of the second display device can be changed, wherein
said first display device is a planar monitor housed in a flat monitor case having a display surface on one face, is made to be freely rotatable in a direction orthogonal to said light axis by centering around one side of said planar monitor and is made to be freely rotatable by centering around an axis perpendicular to said light axis direction and also approximately horizontal with said light axis in a state of turning in said orthogonal direction.

18. An image pickup apparatus according to claim 17, wherein said first display device is arranged such that when said planar monitor is turned to an opposite side and returned to a housing position of the planar monitor so as to be folded, the display surface of said planar monitor faces upward.

19. An image pickup apparatus according to claim 17, wherein on the rear portion of said handle, the second display device is provided approximately on a same axis as said handle and said second display device includes a viewfinder.

20. An image pickup apparatus according to claim 17, further comprising:
a shoulder attachment mounted on said image pickup apparatus body detachably, said shoulder attachment including a shoulder attaching portion supported such that it can be approaching/departing with respect to a back face of said image pickup apparatus body.

* * * * *